(12) United States Patent
Goden et al.

(10) Patent No.: US 7,207,884 B2
(45) Date of Patent: *Apr. 24, 2007

(54) IMAGE PROCESSING DEVICE, IMAGE PROCESSING METHOD, AND GAME DEVICE AND STORAGE MEDIUM USING THE SAME

(75) Inventors: Takeshi Goden, Tokyo (JP); Masaru Takano, Tokyo (JP)

(73) Assignee: Sega Corporation, Tokyo (JP)

( * ) Notice: Subject to any disclaimer, the term of this patent is extended or adjusted under 35 U.S.C. 154(b) by 696 days.

This patent is subject to a terminal disclaimer.

(21) Appl. No.: 10/157,997

(22) Filed: May 31, 2002

(65) Prior Publication Data

US 2002/0151361 A1 Oct. 17, 2002

Related U.S. Application Data

(63) Continuation of application No. 09/134,446, filed on Aug. 14, 1998, now Pat. No. 6,419,582, which is a continuation of application No. 08/765,813, filed on Jul. 10, 1997, now Pat. No. 5,830,066.

(30) Foreign Application Priority Data

May 19, 1995 (JP) ................................. 7-145597

(51) Int. Cl.
*A63F 9/24* (2006.01)
(52) U.S. Cl. ....................................................... 463/33
(58) Field of Classification Search .................. None
See application file for complete search history.

(56) References Cited

U.S. PATENT DOCUMENTS 4,672,541 A 6/1987 Bromley
(Continued)

FOREIGN PATENT DOCUMENTS

EP 0 550 244 42 7/1993
(Continued)

OTHER PUBLICATIONS

Forssell, L.K., "Visualizing Flow Over Curvilinear Grid Surfaces Using Line Integral Convolution," Institute of Electrical and Electronics Engineers, pp. 240-247 XP000515797 (Oct. 17, 1994).
(Continued)

*Primary Examiner*—Mark Sager
(74) *Attorney, Agent, or Firm*—Finnegan, Henderson, Farabow, Garrett & Dunner, L.L.P.

(57) ABSTRACT

An object of this invention is to provide an image processing device which does not interrupt the flow of a game.

The processing board in the main game device attaches information required by the player at the completion of each stage to a map and provides it to the player by displaying it on the display in the following way. The front edge of the truck 20 is displayed (FIG. 5(*a*)), and camera work is conducted showing the game characters 24, 25 riding in the truck 20 (FIG. 5(*b*)). In order that the relationship between the characters 24, 25 and the truck 20 can be appreciated, a bird's-eye view is shown on the display 1*a* (FIG. 5(*c*)), and the camera work is moved again to diagonally above the characters 24, 25, and an enlarged display of the characters 24, 25 is shown (FIG. 5(*d*)). The map 26 is displayed such that it can be viewed from between the characters 24, 25 (FIG. 5(*e*)), and finally, the map 26 is displayed as an enlarged image (FIG. 5(*f*)).

6 Claims, 22 Drawing Sheets

U.S. PATENT DOCUMENTS

| | | | |
|---|---|---|---|
| 4,824,106 A | | 4/1989 | Ueda |
| 5,175,616 A | | 12/1992 | Milgram et al. |
| 5,191,642 A | | 3/1993 | Quick |
| 5,261,820 A | | 11/1993 | Slye |
| 5,327,158 A | | 7/1994 | Takahashi |
| 5,341,468 A | * | 8/1994 | Shiraishi et al. ............ 345/581 |
| 5,366,376 A | | 11/1994 | Copperman |
| 5,396,585 A | * | 3/1995 | Fujii et al. .................. 345/621 |
| 5,522,018 A | | 5/1996 | Takeda |
| 5,555,354 A | | 9/1996 | Strasnick et al. |
| 5,577,960 A | | 11/1996 | Sasaki |
| 5,598,187 A | | 1/1997 | Ide et al. |
| 5,786,822 A | | 7/1998 | Sakaibara |
| 5,830,065 A | | 11/1998 | Gooden |
| 6,010,405 A | | 1/2000 | Morawiec |

FOREIGN PATENT DOCUMENTS

| | | |
|---|---|---|
| EP | 0579 451 A1 | 1/1994 |
| FR | 2 676 573 A1 | 11/1992 |
| JP | 02 216184 | 8/1990 |
| JP | 04 127279 | 4/1992 |
| JP | 04-127279 | 4/1992 |
| JP | 05 282428 | 10/1993 |
| JP | 6-505817 | 6/1994 |
| JP | 06 238060 | 8/1994 |
| JP | 07 008623 | 1/1995 |
| JP | 07 024142 | 1/1995 |
| JP | 07 110873 | 4/1995 |
| JP | 07 116343 | 5/1995 |
| JP | 7-254072 | 10/1995 |
| JP | 08 229237 | 9/1996 |
| WO | WO 92/09966 | 6/1992 |

OTHER PUBLICATIONS

Anderson, D.P., "Efficient Algorithms for Automatic Viewer Orientation," Computer & Graphics, vol. 9, No. 4, pp. 407-413, (1985).
International Search Report (Oct. 2, 1998).
International Search Report (Aug. 27, 1996).
Notice of Reasons for Refusal dated Apr. 25, 2006 in Japanese Patent Application 8-534709.

* cited by examiner (a)

(b)

(a)

(b)

(a)

69 ; VIEWPOINT (b)

IMAGE PROCESSING DEVICE, IMAGE PROCESSING METHOD, AND GAME DEVICE AND STORAGE MEDIUM USING THE SAME

This is a continuation of application Ser. No. 09/134,446, filed Aug. 14, 1998 (now U.S. Pat. No. 6,419,582), which is a continuation of application Ser. No. 08/765,813, filed Jul. 10, 1997 (now U.S. Pat. No. 5,830,066), both of which are incorporated herein by reference.

TECHNICAL FIELD

The present invention relates to an image processing device, an image processing method and a game device using the same. More particularly, it relates to an image processing device, and the like, for a game machine, or the like, using computer graphics. Furthermore, it also relates to a storage medium whereby these processing steps are stored.

BACKGROUND ART

With the progress of computer graphics technology in recent years, data processing devices, such as game devices or simulation devices, have come into wide, general use. Game devices, for example, are provided with peripherals, such as a joystick (operating lever), buttons, a monitor, and the like, a main game device which conducts data communications with these peripherals, as well as image processing, sound processing, and the like, and a display which displays image signals produced by this main device. The image processing in such game devices is of particularly great importance in raising product value, and therefore image reproduction technology has become increasingly refined in recent years.

One known example of a game device of this kind is "Title Fight" (trademark). In this game, the characters (combatants) are composed by sprites (single-layer pictures), and the background and the like is composed by a scrolling screen.

However, by this means, it is not possible to change the viewpoint and represent the characters three-dimensionally. Therefore, in recent years, it has been sought to compose three-dimensional shapes by a plurality of polygons, and to map texture (pattern) onto these polygons and display characters viewed from any viewpoint.

Known examples of this are TV game devices which depict three-dimensional characters by means of texture-mapped polygon data, and depict background sections, where movement is required in accordance with movement of the characters or change in the viewpoint, by means of textured polygon data also, (for example, Sega Enterprises (Co. Ltd.) "Rail Chase I".)

Thereby, rather than composing characters using sprites, the characters, and the background and the like closely related to the movements of the characters, can be represented as three-dimensional images viewed from prescribed viewpoints.

Incidentally, in a conventional TV game device as described above (for example, Sega Enterprises (Co. Ltd.) "Rail Chase I"), when one stage of the game is completed, the hero characters look at a map and move to the next stage. For this purpose, in this device, the map is formed by separate scroll data, and at the moment one stage has finished, the screen suddenly switches to displaying a map, without any connection to the game environment (First prior art example).

Furthermore, in this device, there is a scene where the hero characters move by riding in a truck, and in this case, the camera work based on the heroes' viewpoint is determined by the direction of movement of the truck. For example, as shown in FIG. 22(a), if the direction changes at points q1, q2, q3, q4, . . . , at point q1, the coordinates of point q2 are read in advance and the viewpoint of the hero characters at point q1 is set in the form of coordinates (X, Y, Z, A) (where A is an angle). In this way, the camera work at the viewpoint of the hero characters as the truck 220 moves to each point q1, q2, q3, q4, is as shown in FIG. 22(b). Specifically, at point q1, for example, it is set as coordinates (X, Y, Z, A) and at point q3, for example, it is set as coordinates (X, Y, Z, B) (where B is an angle).

Here, as shown in FIG. 23, the camera direction is labelled E, the camera orientation is labelled F, and the field of view is labelled G. Thereby, as shown in FIG. 24, before reaching point q11, the camera orientation is F1 and the field of view is G1, after passing point q11 and before reaching point q12, the camera orientation is F2 and the field of view is G2, and after passing point q12 and before reaching point q13, the camera orientation is F3 and the field of view is G3, . . . and in this way, switches in direction occur at individual points, resulting in large changes in the field of view G (Second prior art example).

Moreover, in this device, a river is displayed as a background, or the like. Texture-mapped polygons are used to represent the flow of water in this river, a texture with the appearance of water being applied to the polygons along the flow of the river, and these texture coordinates being changed over time in accordance with the direction of the water flow. For example, as shown in FIG. 25, if texture coordinates are projected onto the polygons 150, 150, . . . about a desired axis, they are displayed such that they move in the same direction as all the polygons 150, 150, . . . . Furthermore, as shown in FIG. 26, if each of the four corners of the polygons 151, 152, 153, 154, 155, 156 is made to correspond to a factor n of the texture, then it is possible to achieve the representation of a winding river flow, according to the shape of each polygon 151, 152, 153, 154, 155, 156 (Third prior art example).

Additionally, in this device, if Z-buffering, which is a technique for erasing hidden surfaces, is used in generating a particular scene, as shown in FIG. 27(a), when looking from viewpoint 210 at a background 220 in the infinite distance, an object in the far distance, or an object 221 having no distance value, the screen has the display range 230 (Fourth prior art example).

Furthermore, since there is a limit on the maximum number of polygons that can be displayed simultaneously using this device, the number of polygons displayed is controlled such that the polygons on the whole screen do not exceed the maximum number (Fifth prior art example).

Incidentally, according to the first prior art described above, there has been a drawback in that the flow of the game is interrupted because a map created separately from the game environment is introduced into the game environment. In other words, there has been a drawback in that, since the viewpoint is usually from within the game, if separate contents are suddenly displayed, this completely disrupts the flow of the game and confuses the player.

Furthermore, according to the second prior art described above, there has been a drawback in that, as shown in FIG. 22 and FIG. 24, at each point q.n (where n is an integer), the camera orientation F is determined by reading the coordinates of the next point, q.n+1, in advance, and hence the viewpoint swings by a large amount because the direction is switched at individual points, and it is hard to create an awareness of the surrounding circumstances. In particular, in curves, dead angles occur more frequently than in reality.

Moreover, according to the third prior art described above, when texture coordinates are projected onto the polygons in the image shown in FIG. 25, the projected surfaces are texture-mapped at a uniform density, but there has been a drawback in that, even if the texture coordinates are moved, they all move in a single direction only, and therefore it is not possible to represent a winding river, for example. Furthermore, in the image shown in FIG. 26, although the texture is made to correspond to the polygons and therefore it can be represented as flowing in a direction corresponding to the shape of the polygons and it can represent the flow of a winding river, there has been a drawback in that the texture density is represented in an altered (compressed) state at changes in the river width, sharp curves, or the like.

In addition, in the fourth prior art described above, three-dimensional computer graphics are used and for this technique, Z-buffering or Z-sorting is often used to display the corresponding image. At present, due to demands for increased speed in processing, in some cases, the Z-buffer (depth information for an object) may be recorded in integer values, or the coordinate values calculated as integers (using a fixed decimal point). Therefore, special processing is conducted if the depth of an object at an infinite distance is to be represented. Moreover, if limits are placed on the display range in the depth direction in order to ensure accuracy when using Z-buffering, then it is necessary to locate the object at a distance that comes within this display range 230. Specifically, as shown in FIG. 27(*a*), the object 221 must be positioned such that it comes within the display range 230. As a result, there is a drawback in that, if the viewpoint 210 moves towards the left side of the diagram, for example, although the background 220 in the infinite distance moves, the object 221 at a far distance (or an object having no distance value) does not move, and therefore the appearance will change.

Yet further, according to the fifth prior art described above, the total number of polygons on the whole screen is limited. However, there are cases where the game screen is constituted by polygons representing the background and polygons representing enemies, and the like, and in particular, there are cases where the enemies increase in number as the game progresses. Therefore, in order to represent the enemies, the number of polygons for the background is restricted, and in some cases, a part of the background image is lost (so-called polygon error). This loss of the background image causes a marked impairment in the quality of the game image.

In short, there has been the problem that effective image processing cannot be achieved in conventional image processing devices, such as game devices of this type.

Therefore, this invention was made in order to overcome these problems.

A first object of this invention is to provide an image processing device which does not interrupt the flow of a game.

A second object of this invention is to provide an image processing device capable of moving a viewpoint in a natural state.

A third object of this invention is to provide an image processing device capable of displaying natural movement.

A fourth object of this invention is to provide an image processing device comprised such that, even if the viewpoint moves, a screen in the far distance will appear in a similar state to a natural state.

A fifth object of this invention is to provide an image processing device capable of preventing loss of background images.

DISCLOSURE OF THE INVENTION

In an image processing device which causes a moving object composed in three-dimensional spatial coordinates to move, and generates viewpoint images whereby the moving object is viewed from prescribed viewpoints, this invention comprises information representing object generating means for composing an information representing object whereby information relating to the moving object is represented.

The information representing object generating means of this invention composes a planar object portraying the position of the moving object as the information representing object.

The information representing object generating means of this invention causes the planar object to change from a folded state to an opened state.

This invention comprises viewpoint moving means for moving the viewpoint such that, when an information representing object has been composed, both the moving object and the information representing object are displayed.

The viewpoint moving means of this invention, moreover, moves the viewpoint towards the information representing object.

This invention, moreover, comprises display means for displaying the generated viewpoint image.

This invention is a game device which conducts a game whilst causing the moving object to move in three-dimensional spatial coordinates, and it comprises any of the image processing devices described above.

In an image processing method which generates viewpoint images whereby a moving object composed in three-dimensional spatial coordinates and an information representing object which represents information relating to this moving object are viewed from prescribed viewpoints, this invention comprises:

a first step whereby the viewpoint is moved to a position displaying the moving object only;

a second step whereby the viewpoint is moved to a position displaying both the moving object and the information representing object; and a third step whereby the viewpoint is moved towards the information representing object such that the information representing object is displayed as a large image.

According to this invention, since image processing is conducted whereby an information representing object, such as a planar object or the like, is displayed in three-dimensional spatial coordinates in relation to the moving display object, the planar object on which the necessary information is written can be viewed without an unnatural impression being created, and it can be linked smoothly to the subsequent images. Furthermore, according to this invention, image processing which is advantageous to game development becomes possible.

Moreover, according to this invention, since the viewpoint is controlled such that it moves towards the planar object, the display of the planar object (for example, a map)

can be enlarged gradually and the player can be provided with a space through which he or she can actually look at the map on the game screen.

Furthermore, in this invention, since image processing is conducted whereby a planar object is displayed from a folded state to an opened state, it is possible to achieve a device which creates an impression that approximates reality.

This invention comprises view axis determining means for determining the view axis direction on the basis of a moving object composed in three-dimensional spatial coordinates, a observation point located on the path through which the moving object is to pass subsequently, a transit point located on the path through which the moving object has already passed, and positional information for the observation point and positional information for the transit point.

The view axis determining means of this invention determines the view axis direction on the basis of positional information for a observation point and a transit point located equidistantly in front of and behind the moving object.

If the moving object moves along a curve, the viewpoint determining means of this invention changes the distance from the moving object to the observation point and the transit point, respectively, in accordance with the properties of the curve.

This invention comprises display means for displaying the generated viewpoint image.

This invention is a game device which conducts a game whilst causing the moving object to move in three-dimensional spatial coordinates, and it comprises any of the image processing devices described above.

In an image processing device which causes a moving object composed in three-dimensional spatial coordinates to move, and generates viewpoint images whereby the moving object is viewed from prescribed viewpoints, this invention comprises viewpoint determining means for smoothly changing the line of sight centerd on the viewpoint in accordance with the path of the moving object.

The fact that it smoothly changes the line of sight in accordance with the path of the moving object means that it continuously changes the line of sight, in all sections or at least in a portion thereof, on the basis of the properties, for example, the curvature, tangential vectors, differential coefficients, and the like, of a predetermined path or a path based on the results of movement of the moving object.

The viewpoint determining means of this invention determines the direction of the line of sight centerd on the viewpoint, on the basis of coordinates on the path in front of and behind the moving object.

The viewpoint determining means of this invention calculates two sets of coordinates located equidistantly in front of and behind the moving object, and takes the straight line joining these coordinates as the direction of the line of sight.

If the moving object moves along a curve, the viewpoint determining means of this invention changes the distance from the moving object to the coordinates in front of and behind it, respectively, in accordance with the properties of the curve.

This invention, moreover, comprises display means for displaying the generated viewpoint image.

This invention is a game device which conducts a game whilst causing the moving object to move in three-dimensional spatial coordinates, and it comprises any of the image processing devices described above.

In an image processing method which causes a moving object composed in three-dimensional spatial coordinates to move, and generates viewpoint images seen from the viewpoint of the moving object, this invention comprises:

a first step whereby the position of the moving object is read;

a second step whereby a first point is set on the path to the front of the moving object at a predetermined distance from the position thereof;

a third step whereby a second point is set on the path to the rear of the moving object at a predetermined distance from the position thereof; and a fourth step whereby the direction of the line of sight from the viewpoint is determined by the line joining the first point and second point.

According to this invention, when the moving display object is in a state of travel in a prescribed direction, since at least one set of coordinates in front of or behind the current coordinates of the moving display object are input and the direction of the viewpoint is determined on the basis of these coordinates, the movement of the viewpoint approximates movement of the viewpoint in reality, and a device capable of a more natural representation can be achieved. In addition, image processing that is advantageous to game development also becomes possible.

Furthermore, in this invention, since coordinates located equidistantly in front of and behind the current coordinates of the moving display object are introduced, and the direction resulting when the coordinates of these two points are joined by a straight line is taken as the direction of the viewpoint, the movement of the viewpoint approximates movement of the viewpoint in reality.

Moreover, in this invention, when the moving display object is moving along a curve, since the distance between the current coordinates of the moving display object and the introduced coordinates in front of and behind it are changed in accordance with the curvature of this curve, it is possible to achieve more realistic movement of the viewpoint.

In an image processing device which generates prescribed images by applying texture respectively to linked pluralities of polygons, this invention comprises coordinate processing means for determining a reference vector for each mutually linked plurality of polygons and for causing the texture to move in the direction of the reference vector, the moved texture being applied to the polygons.

In an image processing device which generates prescribed images by applying texture respectively to linked pluralities of polygons, this invention comprises coordinate processing means for determining a reference vector for each longitudinal or lateral polygon chain in the longitudinally and laterally linked pluralities of polygons, and for causing the texture to move in the direction of this reference vector, without any deformation of the texture.

The coordinate processing means of this invention determines the reference vectors on the basis of a predetermined curve.

In this invention, the reference vectors for each of the pluralities of polygons are continuous and the texture corresponds to a flow along the curve.

This invention, moreover, comprises display means for displaying the generated image.

In an information processing method which generates prescribed images by applying texture respectively to linked pluralities of polygons, this invention comprises:

a first step whereby a reference vector is determined for each mutually linked plurality of polygons;

a second step whereby the texture is caused to move in the direction of the reference vector; and a third step whereby the moved texture is applied to the polygons.

According to this invention, for longitudinally and laterally linked pluralities of polygons, a vector acting as a reference is assigned to each polygon chain in the longitudinal or lateral direction, and the texture is caused to move in the direction of this reference vector, without any deformation of the texture. Consequently, it is possible to achieve a more realistic representation of, for example, a screen on which there is a flowing image, such as the flow of water in a river.

Furthermore, in this invention, since the line segments forming the references are defined on the basis of a predetermined curve (for example, the path of a river), there is no alteration in the density of the texture, and a natural flow can be represented.

In an image processing device which causes a moving object to move in three-dimensional spatial coordinates, and generates viewpoint images seen from a viewpoint at the position of this moving object, this invention comprises movement processing means for causing a background image representing the distant background to move with the movement of the viewpoint.

In this invention, the background image forms a cylindrical shape or a spherical shape.

This invention, moreover, comprises display means for displaying the generated image.

This invention is a game device which conducts a game whilst causing the moving object to move in three-dimensional spatial coordinates, and it comprises any of the image processing devices described above.

In an image processing method which causes a moving object to move in three-dimensional spatial coordinates, and generates viewpoint images seen from a viewpoint at the position of this moving object, this invention comprises:

a first step whereby the amount of movement of the moving object is found; and a second step whereby a background image representing the distant background is caused to move on the basis of this amount of movement.

In this invention, since a prescribed screen is caused to move in accordance with the movement of the viewpoint, even if the viewpoint moves, objects or the like which are at infinite distances, or have no distance relationship, can be displayed accurately, and therefore a more realistic representation can be achieved. Furthermore, image processing which is advantageous to game development becomes possible.

Moreover, in the present invention, the prescribed screen is located in a cylindrical or spherical position, the viewpoint is located at the center thereof, and the center in question can be moved with the movement of the viewpoint, and therefore objects or the like which are at infinite distances, or have no distance relationship, can be displayed accurately.

In an image processing device which causes a moving object composed in three-dimensional spatial coordinates to move, and generates viewpoint images seen from a viewpoint at the position of this moving object using polygons, this invention comprises polygon number controlling means for classifying the polygons forming the viewpoint image into a plurality of groups, and for controlling the number of polygons displayed such that, at each group, it is at or below a predetermined maximum number of polygons displayed.

The polygon number controlling means of this invention classifies the polygons forming the viewpoint image into at least a group representing the background and a other group.

This invention, moreover, comprises display means for displaying the generated viewpoint image.

This invention is a game device which conducts a game whilst causing the moving object to move in three-dimensional spatial coordinates, and it comprises any of the image processing devices described above.

In an image processing method which causes a moving object composed in three-dimensional spatial coordinates to move, and generates viewpoint images seen from a viewpoint at the position of this moving object using polygons, this invention comprises:

a first step whereby the polygon forming the viewpoint image is classified into a plurality of groups and a maximum number for the number of polygons displayed is determined at each group; and a second step whereby the number of polygons displayed is controlled at each group within a range not exceeding the maximum display number.

According to this invention, other screens apart from the moving display object are classified into a plurality of types, the number of polygons allocated to each screen is restricted independently, and each screen is composed within the corresponding restriction. Consequently, for example, even in a case where a large number of enemies appear, there is no loss of polygons in the background image.

In an image processing device which causes a moving object composed in three-dimensional spatial coordinates to move, and generates viewpoint images seen from a viewpoint at the position of this moving object, this invention comprises field of view changing means for changing the field of view of the viewpoint image in accordance with the conditions in the direction of movement.

The field of view changing means of this invention broadens the field of view when no object is present in front of the moving object, and narrows the field of view when an object is present.

This invention, moreover, comprises display means for displaying the generated viewpoint image.

This invention is a game device which conducts a game whilst causing the moving object to move in three-dimensional spatial coordinates, and it comprises any of the image processing devices described above.

In an image processing method which causes a moving object composed in three-dimensional spatial coordinates to move, and generates viewpoint images seen from a viewpoint at the position of this moving object, this invention comprises:

a first step whereby conditions relating to objects in front of the moving object are investigated; and a second step whereby the field of view is broadened when no object is present, and the field of view is narrowed when an object is present.

According to this invention, since the field of view is changed in response to conditions in front of the moving object, a natural image can be obtained. For example, if the truck on which the character is riding is travelling across a plain, then a sensation of wide open space can be created by broadening the field of view, whilst if it is travelling through a tunnel, then an enclosed sensation can be created by narrowing the field of view. Furthermore, if it is travelling along a city street, for example, then this falls midway between the two cases above and an intermediate field of view is selected, thereby creating a sense of presence and a sense of speed.

This invention is a storage medium wherein the procedures for implementing any of the methods described above are recorded. This storage medium may comprise, for example, a floppy disk, magnetic tape, photomagnetic disk, CD-ROM, DVD, ROM cartridge, a cartridge fitted with a RAM or flash memory with battery back-up, a fixed RAM cartridge, or the like. A storage medium is a device wherein information (principally, digital data or programs,) is recorded by some physical means, and it is capable of implementing prescribed functions in a processing device such as a computer, special processor, or the like.

BEST MODE FOR CARRYING OUT THE INVENTION

Figure 1:
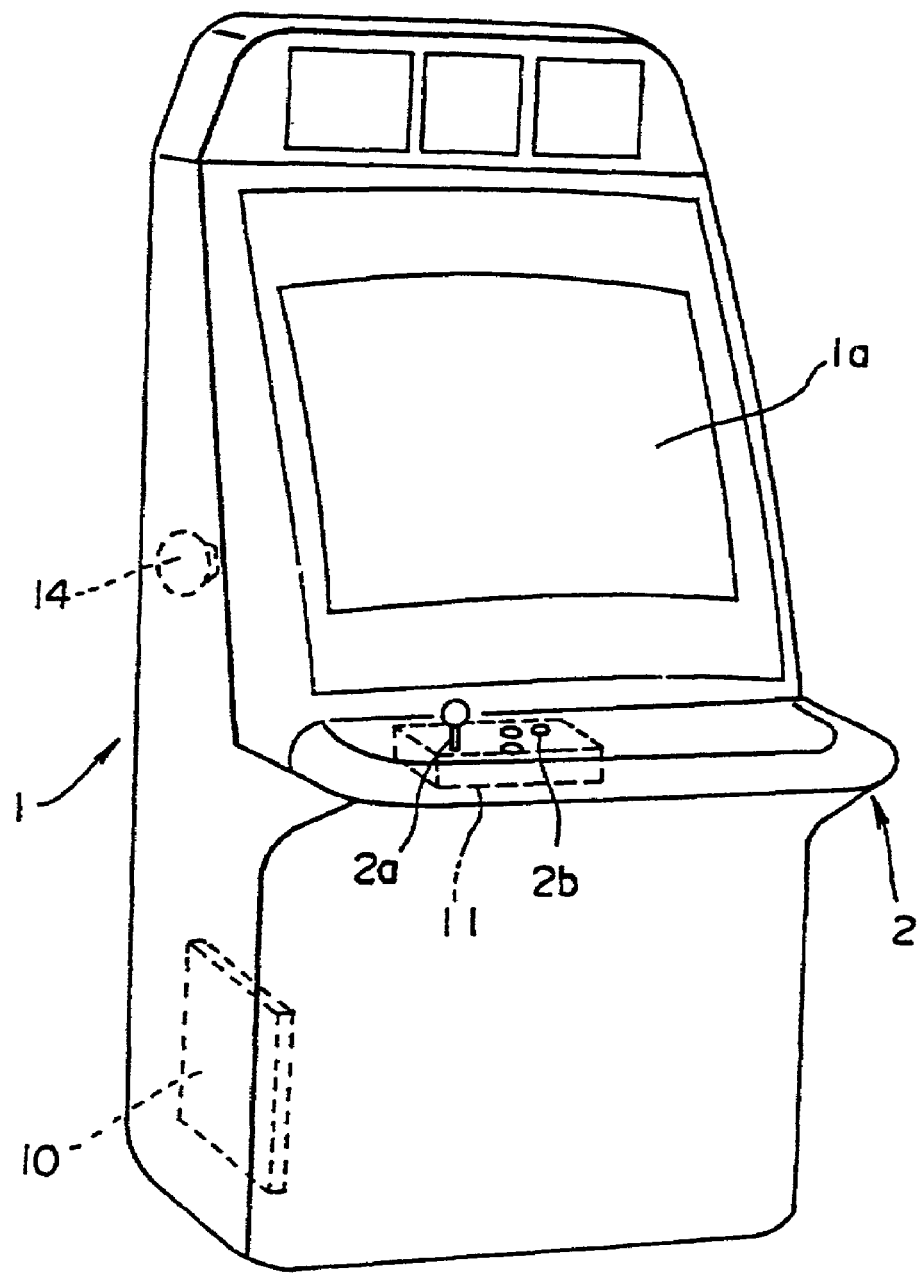
FIG. 1 is an oblique diagram showing the external appearance of an image processing device according to the present invention.

Below, a best mode for carrying out the present invention is described on the basis of FIG. 1–FIG. 5. FIG. 1 shows an external view of this game device. In this drawing, numeral 1 indicates the main game device. This main game device 1 has a box-like shape, and it is provided with a display 1a comprising a CRT, projector, LCD device, plasma display, or the like, as a display means. On the front surface below this display 1a, an operating panel 2 is provided.

A speaker installation hole (omitted from drawing) is provided on the side of the display 1a, and a speaker 14 is installed in this hole.

A game processing board 10 is provided inside this main game device 1a. The display 1a, an operating device 11 in the operating panel 2, and the speaker 14 are connected to the game processing board 10. By means of this structure, a player is able to play a game using the display 1a and the operating device 11 in the operating panel 2.

This operating device 11 provided in the operating panel 2 is constituted by a joystick 2a and push buttons 2b. The player can manipulate characters by means of this joystick 2a and push buttons 2b.

Figure 2:
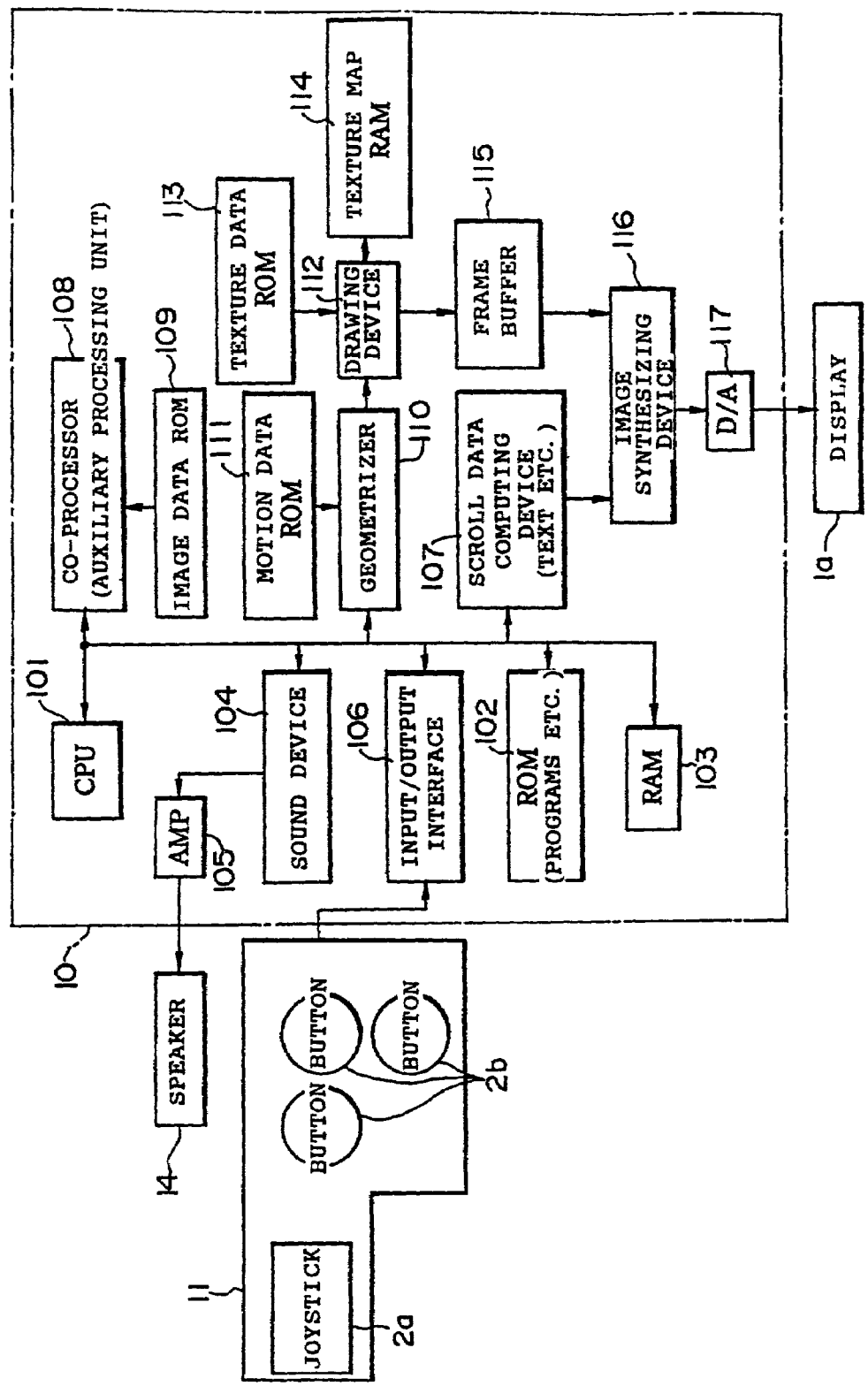
FIG. 2 is a block diagram of the same embodiment.

FIG. 2 is a block diagram showing a game device in which the data processing device according to this embodiment is applied. This game device consists of a display 1a, an operating device 11 located in an operating panel 2, a game processing board 10, and a speaker 14.

Operating signals input via a joystick 2a and push buttons 2b in this operating device 11 are input to the game processing board 10. The display 1a displays game images such as "Deru Chase I", for example, and a projector may be used in place of this display 1a.

Game processing board 10 has a CPU (central processing unit) 101, and comprises, additionally, a ROM 102, a RAM 103, a sound device 104, an AMP (amplifier) 105, an input/output interface 106, a scroll data computing device 107, a co-processor (auxiliary processing unit) 108, a diagram data ROM 109, a geometrizer 110, a motion data ROM 111, a drawing device 112, a texture data ROM 113, a texture map RAM 114, a frame buffer 115, an image synthesizing device 116, and a D/A converter 117.

The CPU 101 is connected via a bus line to: the ROM 102 wherein prescribed programs, image processing programs, and the like, are recorded, the RAM 103 which records data, the sound device 104, the input/output interface 106, the scroll data computing device 107, the co-processor 108, and the geometrizer 110. The RAM 103 functions as a buffer, and, for example, various commands for the geometrizer (display object, and the like), and data required in various calculations, are written into the RAM 103.

The input/output interface 106 is connected to the operating device 11, and it transfers operating signals in digital form from the joystick 2a and the like in the operating device 11 to the CPU 101. The sound device 104 is connected to the speaker 14 via the power amplifier 105, where sound signals generated by the sound device 104 are power amplified and then passed to the speaker 14.

In this mode for implementation, on the basis of a program stored in the ROM 102, the CPU 101 reads operating signals from the operating device 11, and diagram data from the diagram data ROM 109, or motion data from the motion data ROM 111, ("characters, such as self and enemy etc." and "background, such as path of movement, terrain, sky and other structural objects"), and it conducts, at the least, action calculations (simulation), and special effects calculations.

The action calculations simulate the movement of characters in a virtual space in accordance with operating signals given by the player via the operating device 11, and after the coordinate values in three-dimensional space have been determined, a conversion matrix for converting these coordinate values to a field of view coordinate series, and shape data (polygon data), are designated to the geometrizer 110. The diagram data ROM 109 is connected to the co-processor 108 and, consequently, predetermined diagram data is transferred to the co-processor 108 (and the CPU 101). The co-processor 108 is devised such that it chiefly undertakes floating-point calculations. As a result, various decisions are executed by the co-processor 108 and the results of these decisions are relayed to the CPU 101, thereby enabling the calculational load on the CPU to be reduced.

The geometrizer 110 is connected to the motion data ROM 111 and the drawing device 112. Shape data consisting of a plurality of polygons (three-dimensional data for characters, terrain, background and the like, comprising each vertex thereof) is previously stored in the motion data ROM 111, as described above, and this shape data is transferred to the geometrizer 110. The geometrizer 110 performs a perspective conversion of the specified shape data using the conversion matrix supplied by the CPU 101, thereby producing data converted from a coordinate system in a three-dimensional virtual space to a field of view coordinate system. The drawing device 112 applies texture to the converted field of view coordinate system shape data, and outputs it to the frame buffer 115. In order to conduct this texture application, the drawing device 112 is connected to the texture data ROM 113 and the texture map RAM 114, as well as being connected to the frame buffer 115. Incidentally, polygon data refers to data groups for the relative or absolute coordinates of each vertex in a polygon (chiefly, a three- or four-sided shape) consisting of a set of a plurality of vertices. The diagram data ROM 109 stores relatively broad polygon data settings, which are sufficient for executing prescribed decisions. On the other hand, the motion data ROM 111 stores more precise polygon data settings, which relate to shapes constituting screens such as the characters, a truck or a background.

The scroll data computing device 107 computes scroll screen data, such as text or the like (stored in the ROM 102), and the output signal from this computing device 107 and the output signal from the frame buffer 115 are synthesized by the image synthesizing device 116. This synthesized signal is converted from a digital signal to an analogue signal by the D/A converter 117, and is then input to the display 1a. Thereby, polygon screens (simulation results) for the character, truck, terrain (background) and the like stored temporarily in the frame buffer 115, and scroll screens for the required text information, are synthesized in a specified priority to generate the final frame image data. This image data is converted to an analogue signal by the D/A converter 117 and sent to the display 1a, and the game image is displayed in real time.

(Display Processing for Map (Planar Object))

Next, an operation for displaying a planar object (map) carrying text, diagrams or the like, in three-dimensional spatial coordinates, is described with reference to FIG. 3–FIG. 5.

Figure 3:
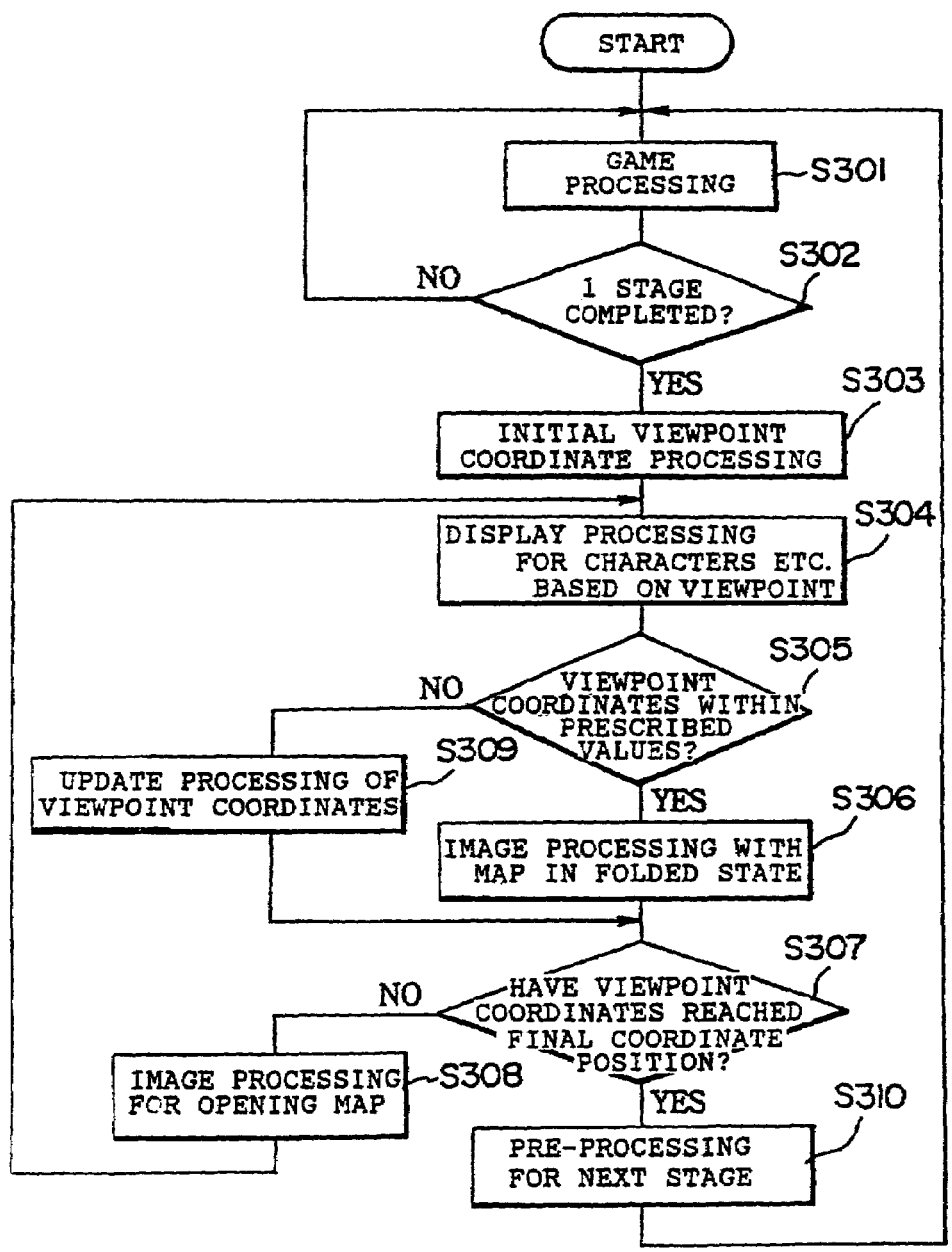
FIG. 3 is a flowchart showing a camera work operation in the same embodiment.

FIG. 3 is a flowchart describing this operation. FIG. 4 and FIG. 5 are illustrative diagrams of the same operation.

In the game device according to this mode for implementation, there is a scene where the hero characters move by riding on a truck. FIG. 4 and FIG. 5 are illustrative diagrams using this scene as an example.

Figure 4:
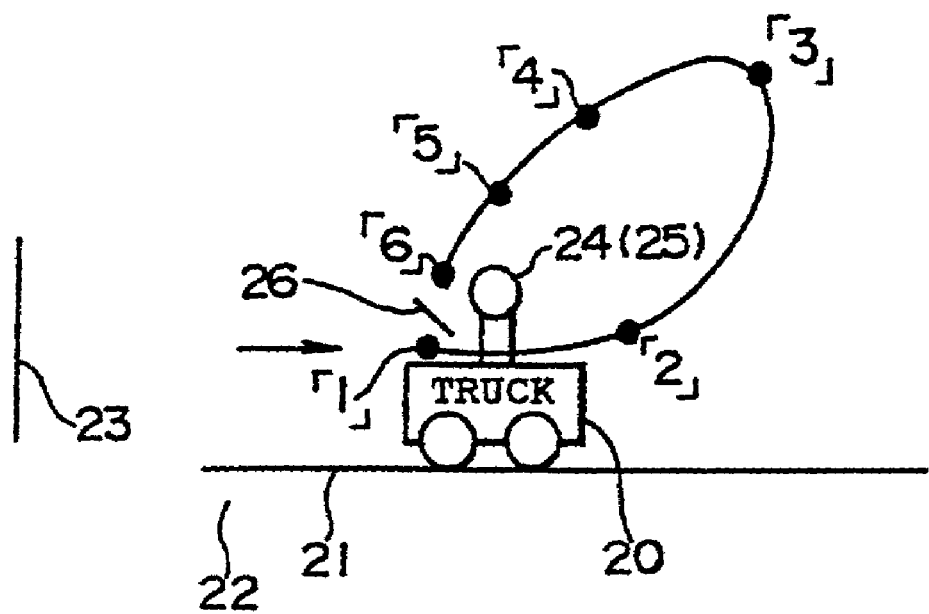
FIG. 4 is an illustrative diagram of an operation in the same embodiment.

In FIG. 4, a truck 20 travels along a track 21 in the direction of the background 21. This state may be treated as though the truck 20 is in a stationary state and the background 23 and the like is coming towards it as indicated by the arrow in the drawing. Characters 24 (25) are riding in the truck 20. The characters 24 (25) opens up a map 26. The curved line circling around the characters 24 (25) in FIG. 4 is the path travelled by the coordinates of the camera viewpoint, which is described below. There are six points on this curve, which are respectively labelled "1", "2", "3", "4", "5" and "6". The camera viewpoint moves in the order of these numbers. Specifically, centerd about the characters 24 (25), it moves upwards from below, and it turns to face downwards. In FIG. 4, the camera viewpoint moves in an anti-clockwise direction.

Figure 5:
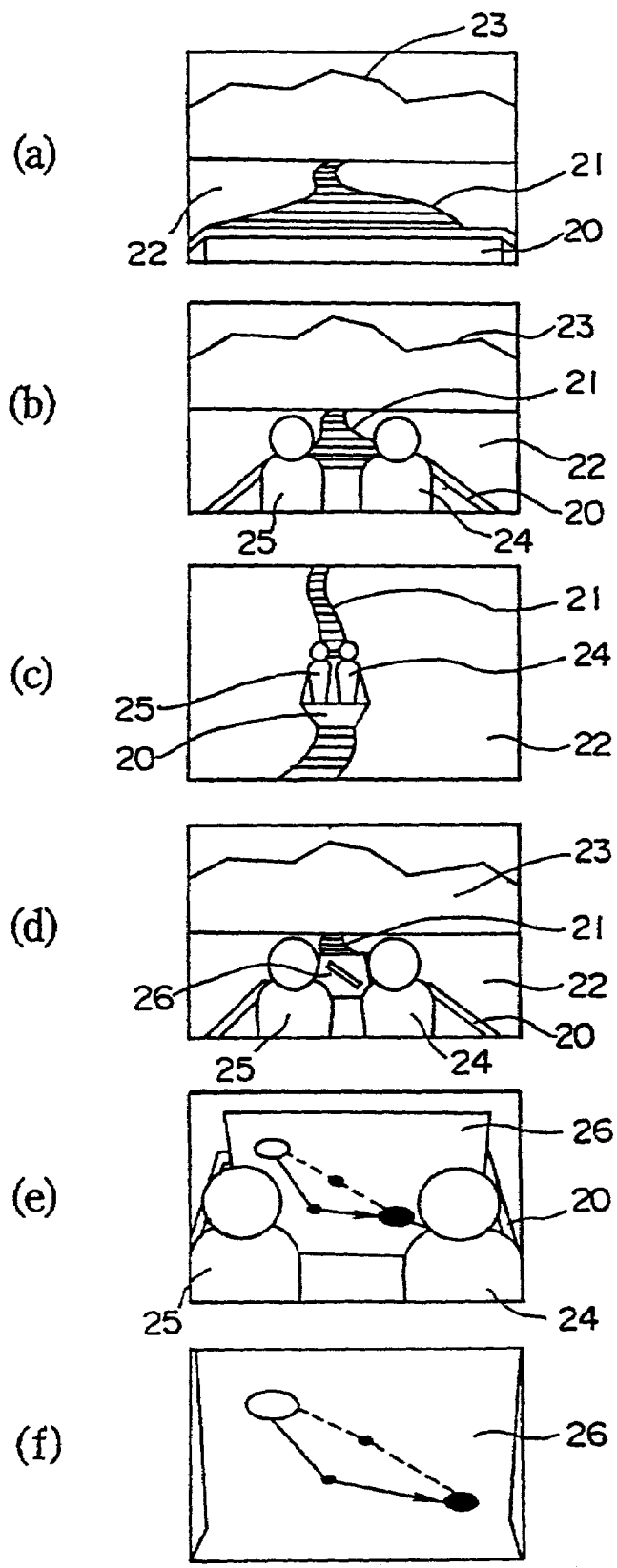
FIG. 5 is an illustrative diagram of an operation in the same embodiment.

FIG. 5 shows six screens in FIGS. 5(a), (b), (c), (d), (e) and (f), respectively, and the screens change in this order. Furthermore, FIGS. 5(a)–(f) correspond respectively to images taken at camera viewpoints 1–6 in FIG. 4.

FIG. 5(a) depicts the edge of the truck 20, where the camera is at viewpoint 1, and it shows the track 21, land surface 22, and mountains and the like in the background 23 in the direction in which the truck 20 is travelling. At this camera viewpoint 1, the characters 24 (25) are not shown.

FIG. 5(b) depicts a rear view of the characters 24 (25), where the camera is at viewpoint 2, and it shows the characters 24 (25), as well as the track 21 and the like.

FIG. 5(c) depicts an upper rear view of the characters 24 (25), where the camera is at viewpoint 3, and it portrays a full image of the truck 20 running along the track 21.

FIG. 5(d) depicts a view based on viewpoint 4, which is shifted slightly forward of viewpoint 3, and here it can be seen that the characters 24 (25) have opened up the map 26.

FIG. 5(e) depicts a view based on viewpoint 5, which is shifted slightly forwards and downwards from viewpoint 4, and here a more enlarged image of the map 26 is shown.

FIG. 5(f) depicts a view based on viewpoint 6, which is even closer to the map 26, and the map 26 is displayed across the whole screen.

Next, the operation based on the flowchart in FIG. 3 is described.

Firstly, the CPU 101 conducts game development processing in accordance with the programs stored in the ROM 102 (step 301, step 302; NO).

Thereupon, when the CPU 101 determines that game processing is finished and one stage has been completed (step 302; YES), it moves to the viewpoint movement control steps. If the viewpoint coordinates are within prescribed values, this indicates, for example, a case where the characters proceed to a defined position in the game as a result of clearing a certain stage. To give a narrative example, this may be a case where the characters, having overcome various dangers to escape from a difficult situation, then climb into the truck once more in order to travel. In other words, it relates to scene changes.

Firstly, the CPU 101 extracts the initial camera viewpoint coordinates from the ROM 102 and stores them in a prescribed area of the RAM 103 (step 303).

Thereupon, the CPU 101 conducts image processing of display data for the characters, background and the like, on the basis of the initial viewpoint coordinates recorded in the RAM 103 (step 304).

Next, if the viewpoint coordinates recorded in the ROM 102 are within prescribed values (step 305; YES), the CPU 101 conducts image processing for displaying the map in a folded state (step 306). As shown in FIG. 4, as a result of the processing in step 306, the camera viewpoint coordinates assume viewpoint "1" located in front of the characters 24 (25). Furthermore, as shown in FIG. 5(a), the display screen viewed from this viewpoint "1" comprises an edge portion of the truck 20, the track 21, the land surface 22, and the background 23. These are displayed on the display 1a.

Thereupon, the CPU 101 determines whether or not the final coordinate position of the camera has been reached (step 307). In the present case, it has clearly not been reached (step 307; NO), and therefore the camera viewpoint coordinates stored in the prescribed area of the RAM 103 are updated (step 308), and the CPU 101 transfers once more to the processing in step 304.

If this processing (steps 304–308) is repeated, as shown in FIG. 4, the camera viewpoint coordinates will assume viewpoint "2" located behind the characters 24 (25). As shown in FIG. 5(b), the display screen viewed from this viewpoint ("2") comprises the truck 20, the characters 24 (25) riding therein, the track 21, the land surface 22, and the background 23. These are displayed on the display 1a.

If this processing (steps 304–308) is further repeated, as shown in FIG. 4, the camera viewpoint coordinates will assume viewpoint "3" located behind and well above the characters 24 (25). As shown in FIG. 5(c), the display screen viewed from this viewpoint ("3") comprises the truck 20, the characters 24 (25) riding therein, the track 21, and the land surface 22. These are displayed on the display 1a in a similar state to a view from the sky.

As this processing is repeated (steps 304–308), before the camera viewpoint coordinates reach "4" in FIG. 4, it is judged by the CPU 101 that the viewpoint coordinates stored in the prescribed area of the RAM 103 have exceeded the prescribed values (step 305; NO). Thereupon, the CPU 101 executes image processing whereby the map 26 is displayed such that it gradually opens out from a folded state (step 309). In this processing, for example, the image is processed such that two points of the coordinates of the polygon forming the map are held as common points, and the other two points are updated every time this step is passed. Thereby, a map in the form of a book is displayed as gradually opening out from a closed state. Accordingly, each time this step is passed, the map in the form of a book opens further, and when it reaches a fully opened state, updating of the polygon coordinates is discontinued.

Similarly, if this processing (steps 304–305, 309, 307, 308) is repeated, as shown in FIG. 4, the camera viewpoint coordinates will arrive at viewpoint "4" located diagonally behind the characters 24 (25). As shown in FIG. 5(d), the display screen viewed from this viewpoint ("4") comprises an enlarged truck 20, the upper bodies of the characters 24 (25) riding therein, the opened map 26 visible between these upper bodies, the track 21, the land surface 22 and the background 23. These are displayed on the display 1a.

Again, if the CPU 101 repeats the processing in steps 304–305, 309, 307, 308, as shown in FIG. 4, the camera viewpoint coordinates will arrive at viewpoint "5" located directly above the characters 24 (25). As shown in FIG. 5(e), the display screen viewed from this viewpoint ("5") comprises a portion of the truck 20, the enlarged upper bodies of the characters 24 (25) riding therein, and an enlarged map 26 visible between the enlarged upper bodies. These are displayed on the display 1a.

If the CPU 101 further repeats the processing in steps 304–305, 309, 307, 308, as shown in FIG. 4, the camera viewpoint coordinates will arrive at viewpoint "6" located in front of the characters 24 (25). As shown in FIG. 5(f), the display screen viewed from this viewpoint ("6") comprises the map 26 in an enlarged state which fills the entire screen of the display 1a. This is displayed on the display 1a. In this case, the CPU 101 judges that the viewpoint coordinates have reached their final values, (step 307; YES), and whilst the map 26 is being viewed, it executes pre-processing for the next stage (step 310), and shifts once more to game processing (step 301).

Incidentally, information such as diagrams, text, figures and the like required by the player are written onto the map 26 which is formed by a polygon. Therefore, the player does not need to call up a special map in order to obtain the required information. This information can be obtained by making the characters on the game screen open out the map. Conventionally, necessary maps have been displayed, by a command or automatically, on a separate screen display in place of the game screen.

As described above, according to this mode for implementing the invention, since an operation is conducted whereby the map 26 is opened out by the characters on the game screen, and this map 26 is displayed on the display 1a such that the player looks down onto it by means of camera work (movement of the viewpoint), it is possible to avoid a display which switches screens, and therefore interruptions to the flow of the game can be prevented. In other words, information required by the player, such as the player's status and position in the game as a whole, or the like, is written onto an object in the game space, and using camera work, this information is displayed in relation to the characters 24 (25) in the game, thereby making it possible to supply the required information and continue the game screen, simultaneously. Consequently, the player becomes fully involved with the characters as he or she experiences the adventure, without being made aware that he or she is playing a game, and thus his or her sense of immersion in the game increases.

Incidentally, it is not necessary for the camera viewpoint position to circle completely around the characters, but, for example, the display of the map 26 may halt in the area of viewpoint "5". Furthermore, the camera viewpoint position may follow points 1–6 in FIG. 4 in order, or it may follow them in reverse order, or alternatively, it may follow them in a non-consecutive order. The camera viewpoint position may move continuously between these points, or it may move onto points 1–6 only. The camera viewpoint position may move within a vertical plane as shown in FIG. 4, or it may move within a horizontal plane. Moreover, the camera may pan by moving slowly left and right or up and down, or zoom, as in cinematic filming. In short, the screen display should be changed gradually to show information sources, such as maps, explanations, and diagrams, which are continuously required, without interrupting the game screen. In doing this, the surrounding scenery and the characters should be included in the display.

The foregoing described a truck ride scene as an example, but naturally it is not limited to moving scenes of this kind. Besides this, it may be applied to cases where a stage has been cleared, or where the characters are taking a rest, or where they are selecting equipment, for instance. In short, it may be applied to any scene where a screen change or temporary interruption is required.

(Operation for Determining Viewpoint)

Next, an operation for determining the line of sight in this game device is described with reference to FIG. 6–FIG. 10.

Figure 6:
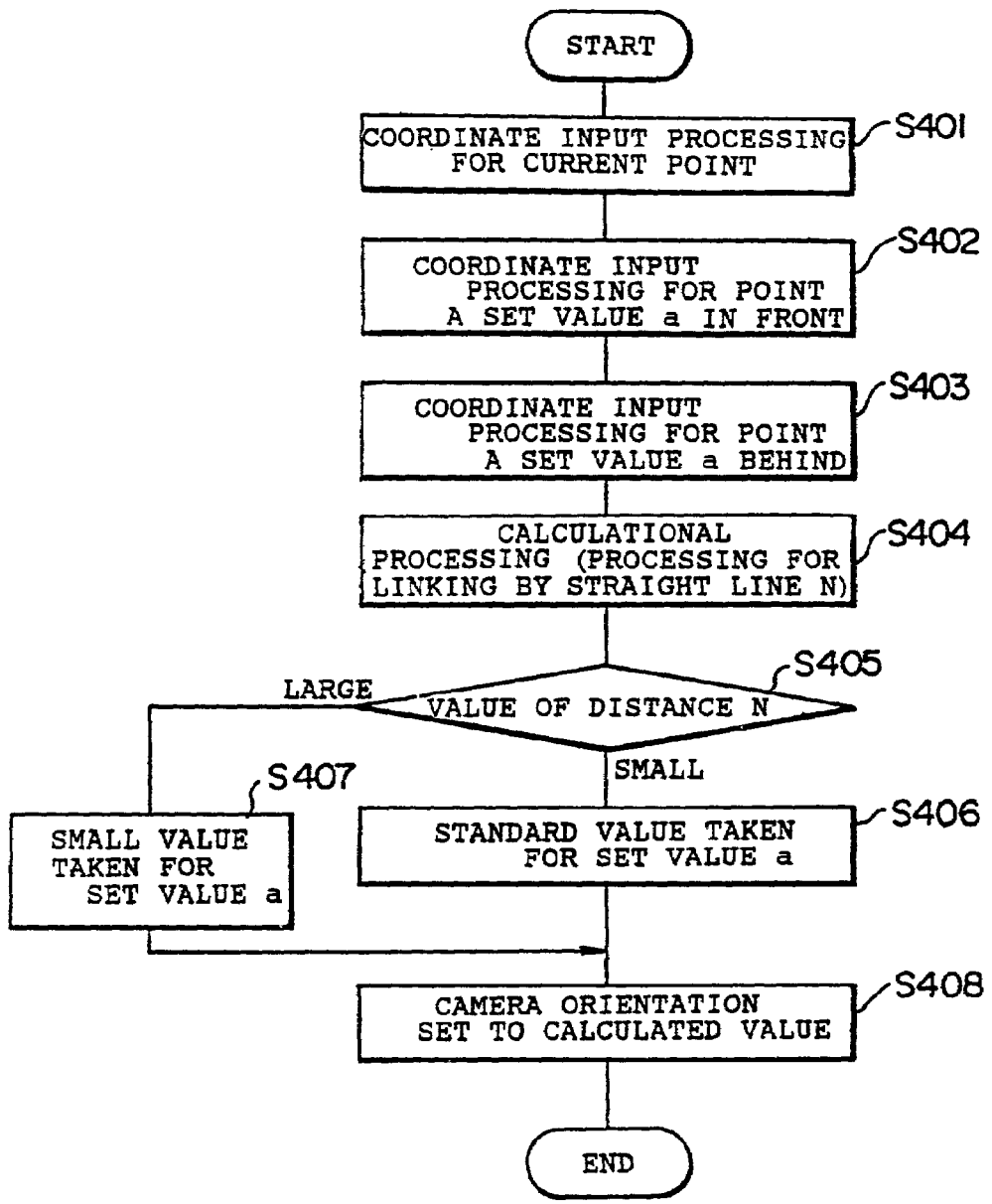
FIG. 6 is a flowchart of an operation for obtaining a smooth angle of view in the same and further embodiments.

Here, FIG. 6 is a flowchart of this operation.

Figure 7:
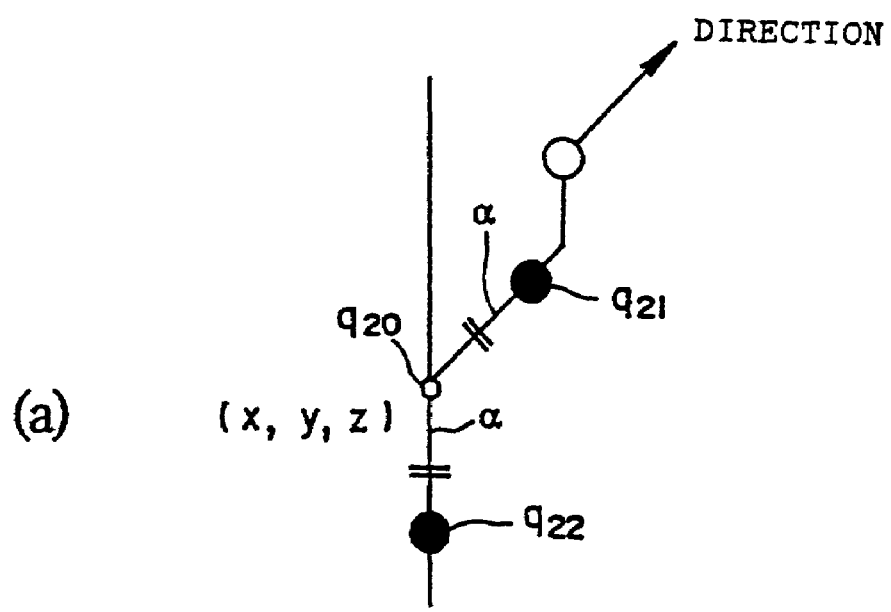
FIG. 7 is an illustrative diagram of the same operation.
Figure 7:
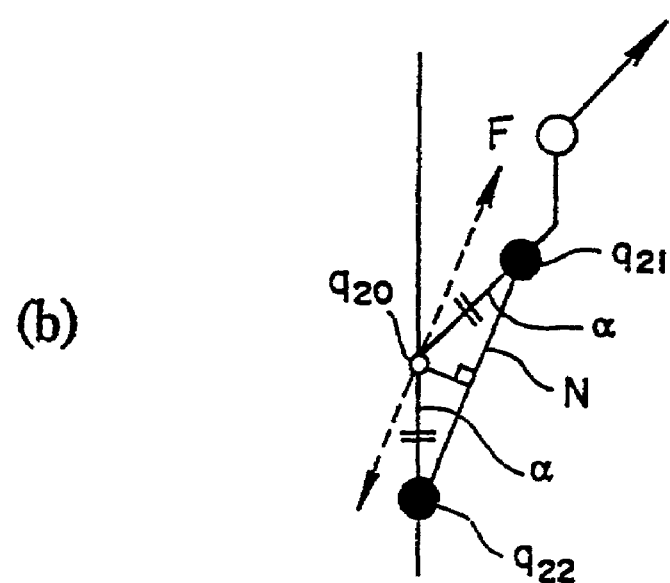
Figure 8:
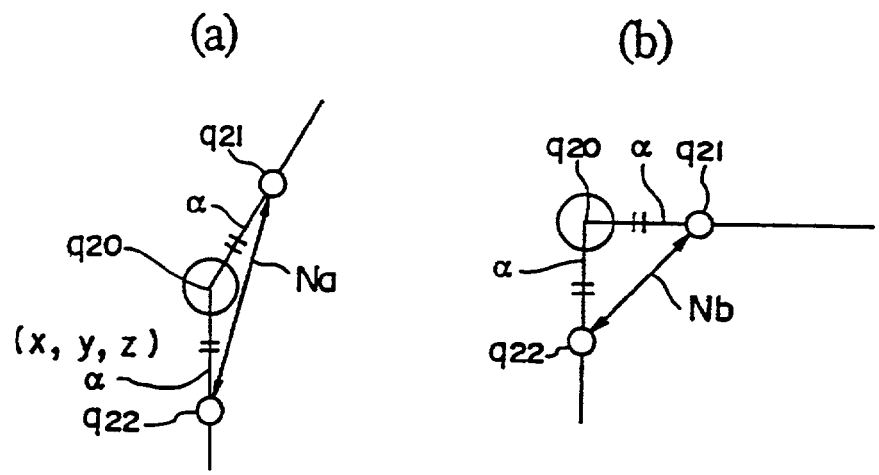
FIG. 8 is an illustrative diagram of the same operation.
Figure 9:
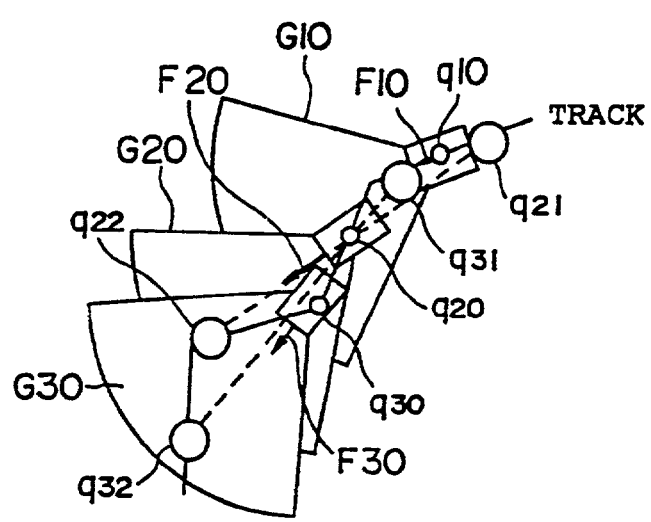
FIG. 9 is an illustrative diagram of the same operation.

FIG. 7–FIG. 9 are illustrative diagrams of this operation.

Figure 10:
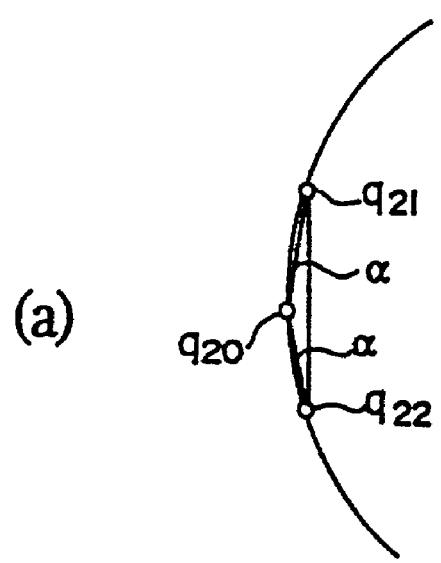
FIG. 10 is an illustrative diagram of the same operation.
Figure 10:
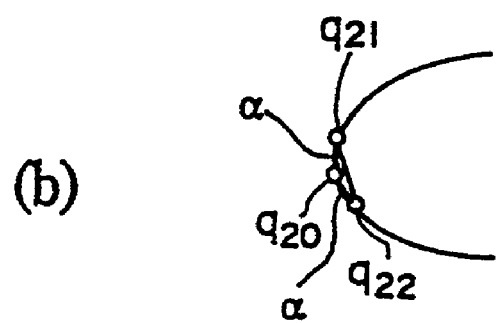

FIG. 10 is a diagram for describing a method of determining the line of sight in accordance with the curvature of a curve.

As in the foregoing, the description below takes as an example a case where the characters travel by riding on a truck 20. During processing of the game program, the CPU 101 initiates the flowchart shown in FIG. 6, when the truck 20 in which the hero characters are riding enters a curve.

Upon initiating this flowchart, the CPU 101 reads the current point q20 coordinates of the truck 20 (step 401). In other words, as shown in FIG. 7(a), the current point q20 coordinates (X, Y, Z) of the truck 20 are input to the CPU 101.

Next, in accordance with a predetermined distance setting a, the CPU 101 inputs the coordinates of a point q21 on the track to the front of the truck 20 and separated from the current coordinates of the truck 20 by the distance setting a (step 402). Here, the symbol a is a distance setting used to obtain point coordinates located at a prescribed distance in front of and behind the current point of the truck 20, and it is stored in a prescribed area of the RAM 103, for example. The CPU 101 inputs coordinates in front of and behind the truck 20 on the basis of this distance setting a.

Next, the CPU 101 inputs the coordinates of a point q22 separated from the current coordinates of the truck 20 by the distance setting a to the rear of the truck 20 (step 403). Thereby, the coordinates of points (positions) q21 and q22 located equidistantly in front of and behind the current coordinates of the truck 20 are input to the CPU 101.

Next, the CPU 101 conducts calculational processing to link the coordinates obtained in steps 402 and 403 by a straight line (step 404). As shown in FIG. 7(b), this corresponds to a process linking point q21 and point q22 by means of the straight line N.

Since the coordinates of points q21 and q22 are already known, the CPU 101 can find the length of the straight line N in the calculation in step 404. The angle of the curve can be determined from the length of this straight line N. For example, as shown in FIG. 8(a), the straight line Na between points q21 and q22 is long when the curve has an obtuse angle. When the points q20, q21 and q22 lie in a straight line, the length of straight line Na takes its maximum value of 2 a. On the other hand, as shown in FIG. 8(b), as the angle of the curve approaches an acute angle, the straight line Nb linking points q21 and q22 becomes shorter. In other words, when q a>q b, Na>Nb. The length of the straight line N(90°) when q=90° can be calculated in advance ($N^2=2\ a^2$), so this N(90°) value can serve as a reference for judging whether a curve is obtuse or acute.

Thus, the CPU 101 determines the value for the distance N of the straight line obtained in step 404 (step 405). Here, if the straight line Na is long, as shown in FIG. 8(a), the CPU 101 judges that the curve has an obtuse angle and it sets the distance setting a to a standard value and stores it in the RAM 103 (step 407). On the other hand, if the straight line Na is short, as shown in FIG. 8(b), the CPU 101 judges that the curve has an acute angle and it sets the distance setting a to a small value and stores it in the RAM 103 (step 406). The distance setting a is switched in this way, according to whether the angle of the curve is obtuse or acute, in order that the camera orientation changes naturally through curves, even in places where the track 21 of the truck 20 curves sharply.

The CPU 101 then adapts the straight line found in step 404 to the current point q20 by moving it to a parallel position, as shown in FIG. 7(b), and this is stored in a prescribed area of the RAM 103, for example, as a camera orientation F (step 408).

Figure 24:
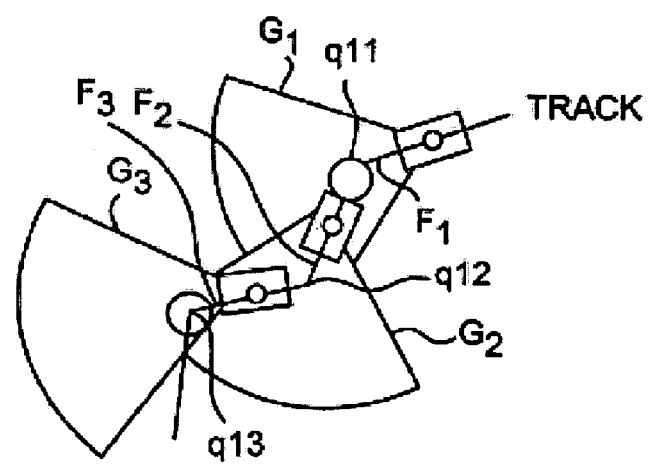
FIG. 24 is an illustrative diagram of fields of view obtained by conventional angle of view processing.
Figure 25:
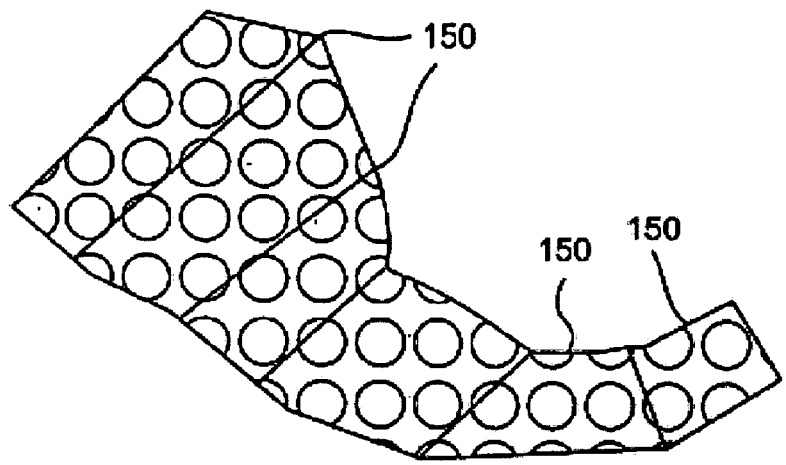
FIG. 25 is a diagram for the purpose of describing a conventional river flow.
Figure 26:
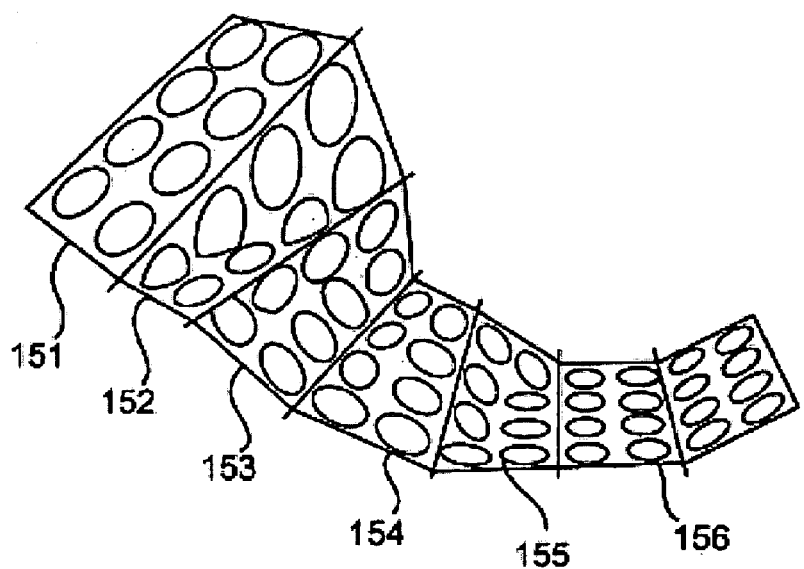
FIG. 26 is a diagram for the purpose of describing a conventional river flow.
Figure 27A:
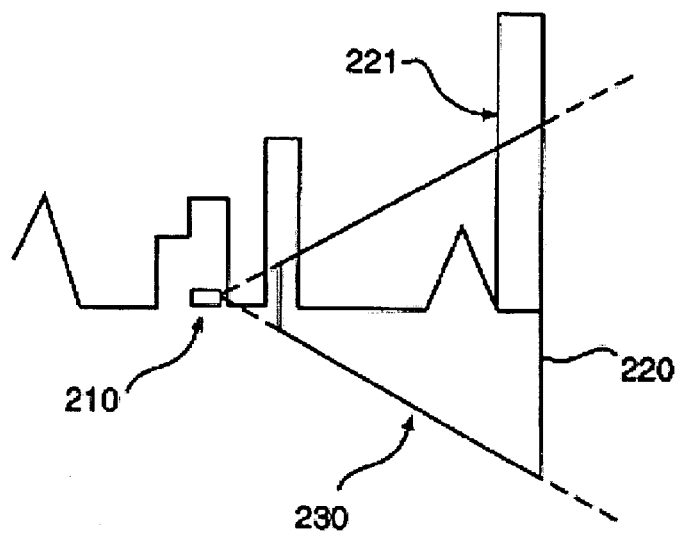
FIG. 27 is an illustrative diagram of conventional movement of a background.
Figure 27B:
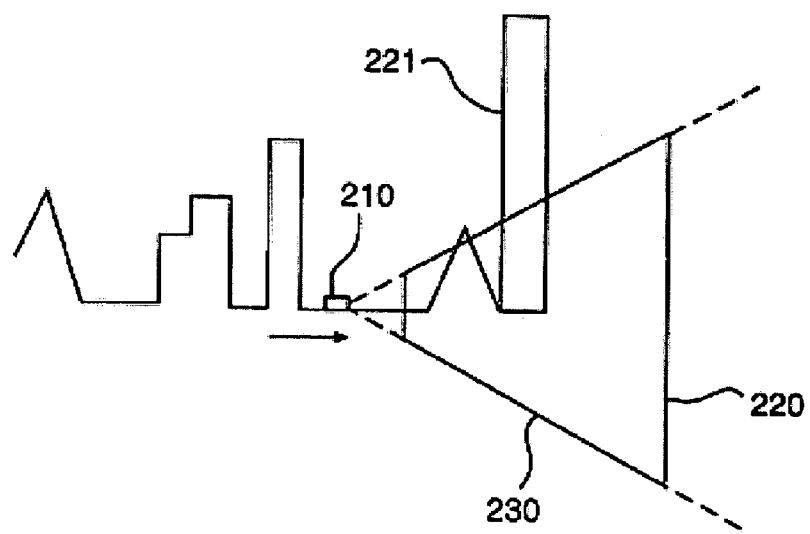

By repeating these processing steps 401–408, it is possible to change the camera line of sight smoothly through a curve. For example, as shown in FIG. 9, at camera orientation F10 at point q10, the field of view is G10. At point q20, the camera orientation will be F20 derived from points q21 and q22, and the field of view will be G20. Furthermore, at point q30, the camera orientation will be F30 derived from points q31 and q32, and the field of view will be G30. As FIG. 9 illustrates, the fields of view overlap partially with each other as the line of sight changes. In the prior art example in FIG. 24, there are virtually no overlapping portions in the fields of view, so there is a large swing between the screens displayed each time the viewpoint changes. It can be seen that, according to the processing in this mode for implementation, the field of view G moves smoothly, as shown in FIG. 9.

Since the distance setting a can be varied in response to the angle, the interval according to distance setting a can be made large when the curve is gentle, as shown in FIG. 10(a), for example, and it can be made small when the curve is sharp, as shown in FIG. 10(b). With regard to the number of times the calculation of straight line N is repeated, in FIG. 10(a), this number is relatively small, and in FIG. 10(b), it is relatively large. Therefore, by varying the distance setting a according to the angle, optimal processing can be conducted whilst reducing the load on the CPU 101.

The camera line of sight can be made to follow the curve more closely, the smaller the value given to distance setting a, but this increases the load on the CPU 101. On the other hand, as the value of a is raised, the movement of the camera line of sight becomes less and less smooth, but the load on the CPU 101 is reduced. Therefore, these two conditions are taken into consideration when actually determining the value of a. If the tightest curve is known in advance, then a minimum value for a that is not unfeasibly small is determined using this curve as a reference, and as the curves become more gentle, a is gradually increased. For example, a fixed increment D a should be set and this is multiplied as $n_x D$ a (where n is an integer), as the radius of the curve increases. If a is set to an extremely small value, then this will yield the direction of the tangent to the curve at a certain point (for example, point q 20). However, in digital processing, curves are displayed in a discontinuous rather than a continuous form, so there is no need to reduce the spacing beyond this.

According to this mode for implementation, since two points on the track in front of and behind the truck are selected and the camera line of sight is determined on the basis of these two points, it is possible to create natural movement, without the viewpoint (camera orientation F) moving by a large amount when passing through curves. Furthermore, the weight of objects that is felt when passing through curves can also be represented. Moreover, since the direction of the viewpoint is determined by means of points in front of and behind the current coordinate point, it is possible to respond even when the travel of the viewpoint is reversed. In addition, since the spacing between the two points can be adjusted, the range of oscillation in the viewpoint can also be adjusted. Furthermore, since the angle of the curve can be determined from the straight line N linking the two points, it is possible to respond directly to the motion data.

The processing described above is not applicable solely to the case of a truck running along a track. It can also be applied, for example, to the case of a car going around a curve, or an aeroplane climbing or descending. Furthermore, it can also be applied when the curve is not necessarily required to be smooth, for instance, on a course formed by a plurality of connected straight lines. In short, the processing described above is applicable in cases where the reference direction for the screen display is determined according to fixed rules.

Furthermore, in determining the reference direction for the screen display, a different method may be used, for instance, determining the camera orientation on the basis of the straight line angle information, without moving the straight line to a parallel position. Alternatively, the processing may be conducted on the basis of direction information (angle information) previously established in relation to the curve, without needing to derive straight lines.

Furthermore, the points from which straight line N is derived need not necessarily be points on either side of a moving object on a track, and they may be based on current positional information for the moving object and positional information for points through which the moving object will subsequently pass (for example, a point slightly ahead and a point a long way ahead).

(Operation for Coordinate Processing to Represent a River Flow)

Figure 11:
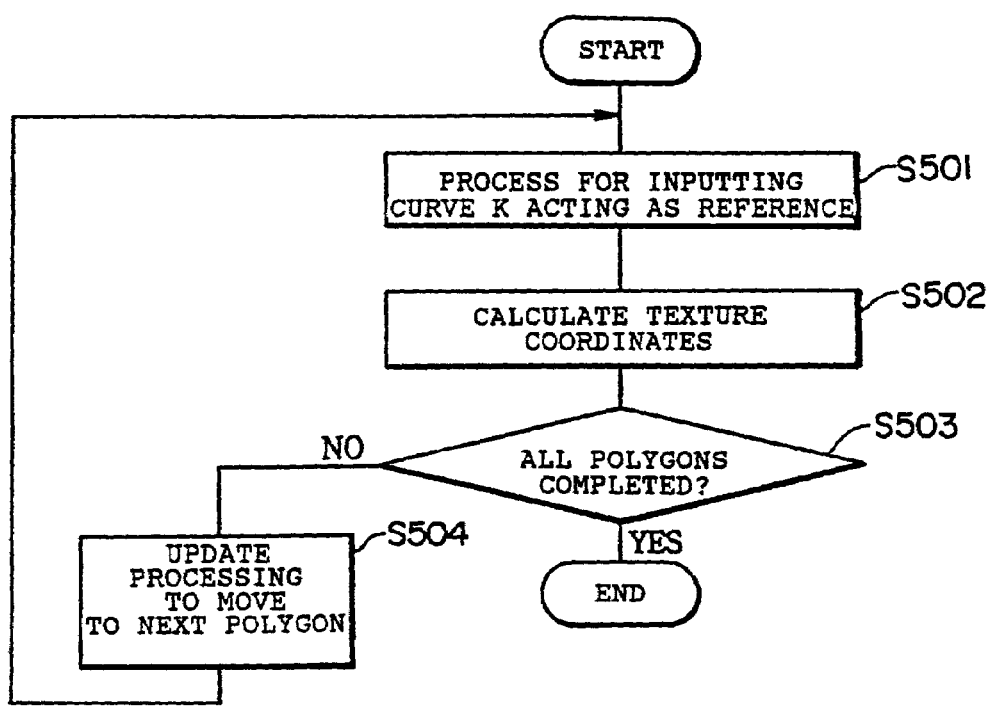
FIG. 11 is a flowchart of an operation for creating a river flow in the same and further embodiments.
Figure 12:
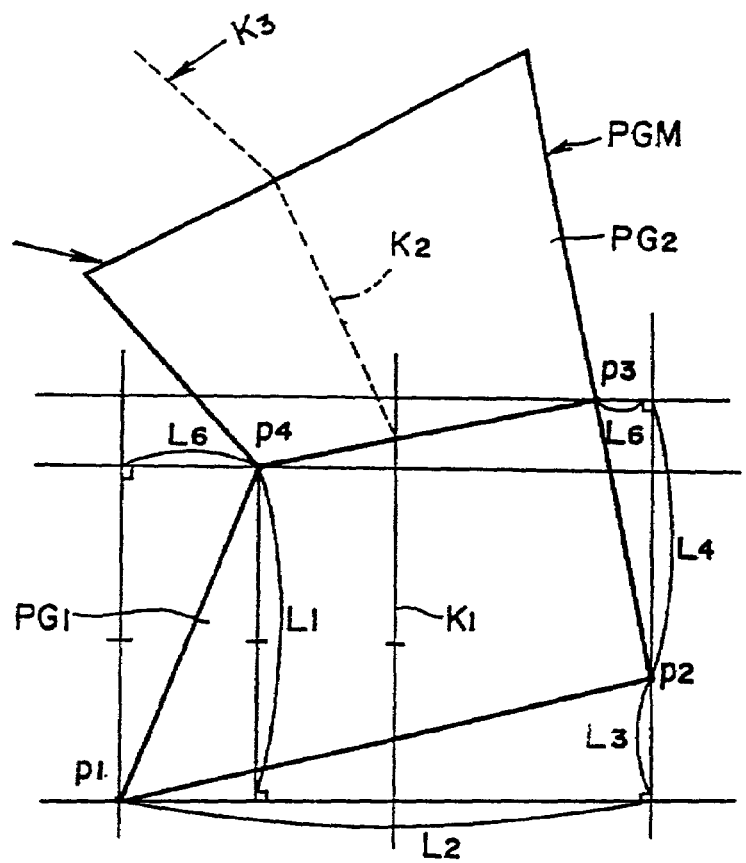
FIG. 12 is an illustrative diagram of the same operation.
Figure 13:
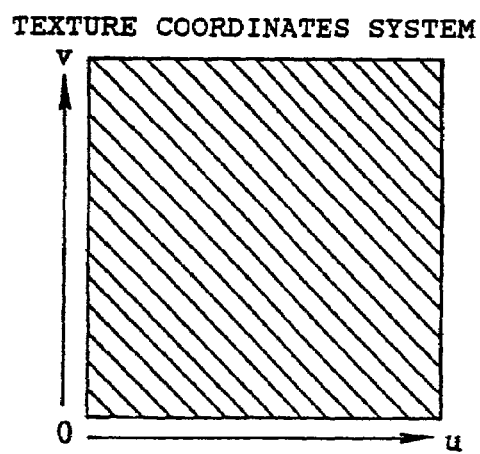
FIG. 13 is an illustrative diagram of the same operation.
Figure 14:
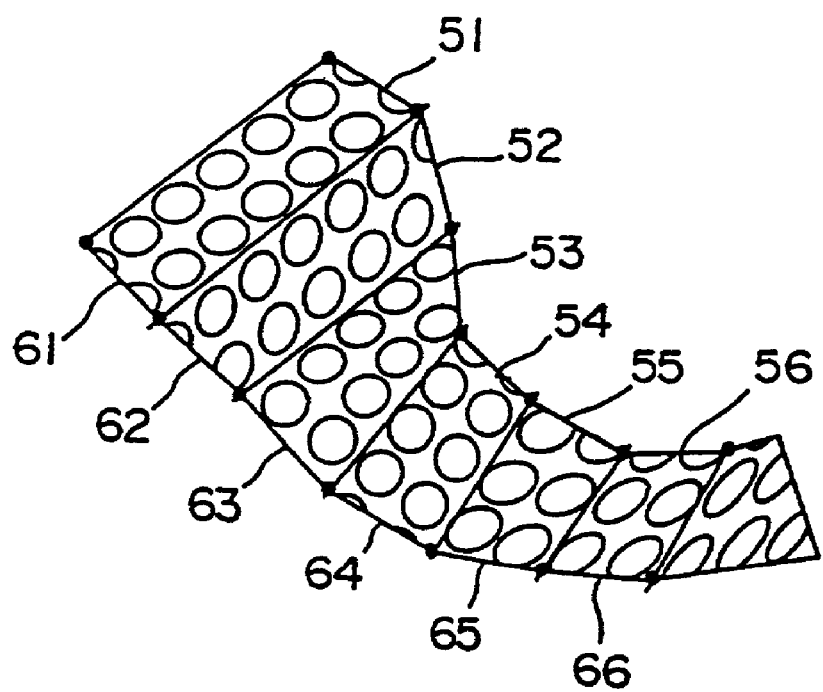
FIG. 14 is an illustrative diagram of the same operation.

FIG. 11 is a flowchart for describing the flow of a river according to this mode for implementation. FIG. 12 is an illustrative diagram for describing the relationship between a polygon and various coordinates. FIG. 13 is an illustrative diagram of a texture coordinates system: the horizontal axis is taken as u, and the vertical axis, as v. An image representing a river is displayed by means of pluralities of polygons linked in both directions u and v. FIG. 14 is an illustrative diagram showing a river flow represented by means of this process.

The river flow is represented by the following method. As shown in FIG. 12, a section corresponding to a river is constituted by a polygon PGM wherein a plurality of polygons PG1, PG2, . . . are linked successively. Thereupon, texture with the appearance of a water flow is applied respectively to each polygon PG1, PG2, . . . . These texture coordinates are caused to change in the direction of the river flow as time passes. By this means, a river flow can be represented.

In this mode for implementation, as shown in FIG. 12, curves K1, K2, . . . (same number as polygons in direction of chain) which act as references for the texture coordinates are prepared for each polygon PG1, PG2, The polygons PG1, PG2, . . . in this diagram show one portion of a plurality of polygons linked longitudinally and laterally. Consequently, polygons not shown in the drawings are linked in the lateral direction of polygons PG1 and PG2, also.

Here, it is assumed that the CPU 101 has transferred to processing for representing a river flow. Thereupon, the CPU 101 processes the flowchart in FIG. 11. Firstly, the CPU 101 inputs the reference vector K1 acting as a texture coordinate reference prepared for each polygon PG1 (step 501). A reference vector is determined for each polygon chain in the lateral direction (direction perpendicular to that in which the river is flowing) on the basis of a predetermined river course (curve). For example, reference vector K1 is set for the polygon chain including polygon PG1, and reference vector K2 is set for the polygon chain including polygon PG2, respectively. The reference vectors represent the flow of the river.

Next, the CPU 101 calculates texture coordinates using this reference vector K1 (step 502). This calculation is made as follows, for example. In polygon PG1 in FIG. 12, L1, L3 and L4 are taken as parallel segments to reference vector K1, and L2, L5 and L6 are taken as perpendicular segments to reference vector K1. Thereupon, the texture coordinates for vertices p1, p2, p3, p4 of polygon PG1 are found from:

p1=(u, v)
p2=(p1.u+L2, p1.v+L3)
p3=(p2.u+L4, p2.v+L5)
p4=(p1.u+L6, p1.v+L1)

Here, p1.u indicates the u component of p1, and p1.v indicates the v component of p1. By means of this conversion, the texture coordinates and the polygon PG1, PG2, . . . coordinates can be matched to each other.

After conducting this calculation, the CPU 101 determines whether or not all the polygons have been completed (step 503).

Here, since they are not yet completed (step 503; NO), the polygon PG subscript number is updated (step 504) so that calculation can be made for the next polygon PG, and the CPU 101 returns again to the processing in step 501.

By causing each texture to move according to predetermined reference vectors by means of the processing in steps 501–504, an image representing a river flow can be obtained.

In this mode for implementation, when a representation of flowing water is conducted by means of texture-mapped polygons, as shown in FIG. 14, the water is represented as flowing along the course of a river without any changes in the density of the textures 61, 62, . . . on the polygons 51, 52, . . . , and therefore a natural water flow can be reproduced.

In other words, by projecting mapping data expressed as texture coordinates onto polygons showing a river flow on the basis of reference vectors following the river flow, the textures for representing the river flow can be changed in shape as appropriate to match the shape of the river flow. Therefore, a natural representation of a river flow is possible.

The reference vectors K1, K2, . . . correspond individually to the polygons PG1, PG2, . . . . A reference vector acts as the reference for the river flow in the corresponding polygon. In some cases, the reference vector map be defined by the shape of the polygon, for example, as a line perpendicular to the sides, or as a line linking the midpoints of the sides. Furthermore, if the river is flowing in a predetermined direction, the reference vector may be defined for each polygon on the basis of the curve representing this flow.

The conversion formulae between the texture coordinates and the polygons are not limited to the example given above, and other conversion formulae may be used. For example, the conversion may be based on the angle formed by a side of the polygon and the reference vector.

The example described above concerned a case where a river flow is represented. This mode for implementation can be applied to the representation of other flowing images.

(Operation for Screen Movement Processing)

Figure 15:
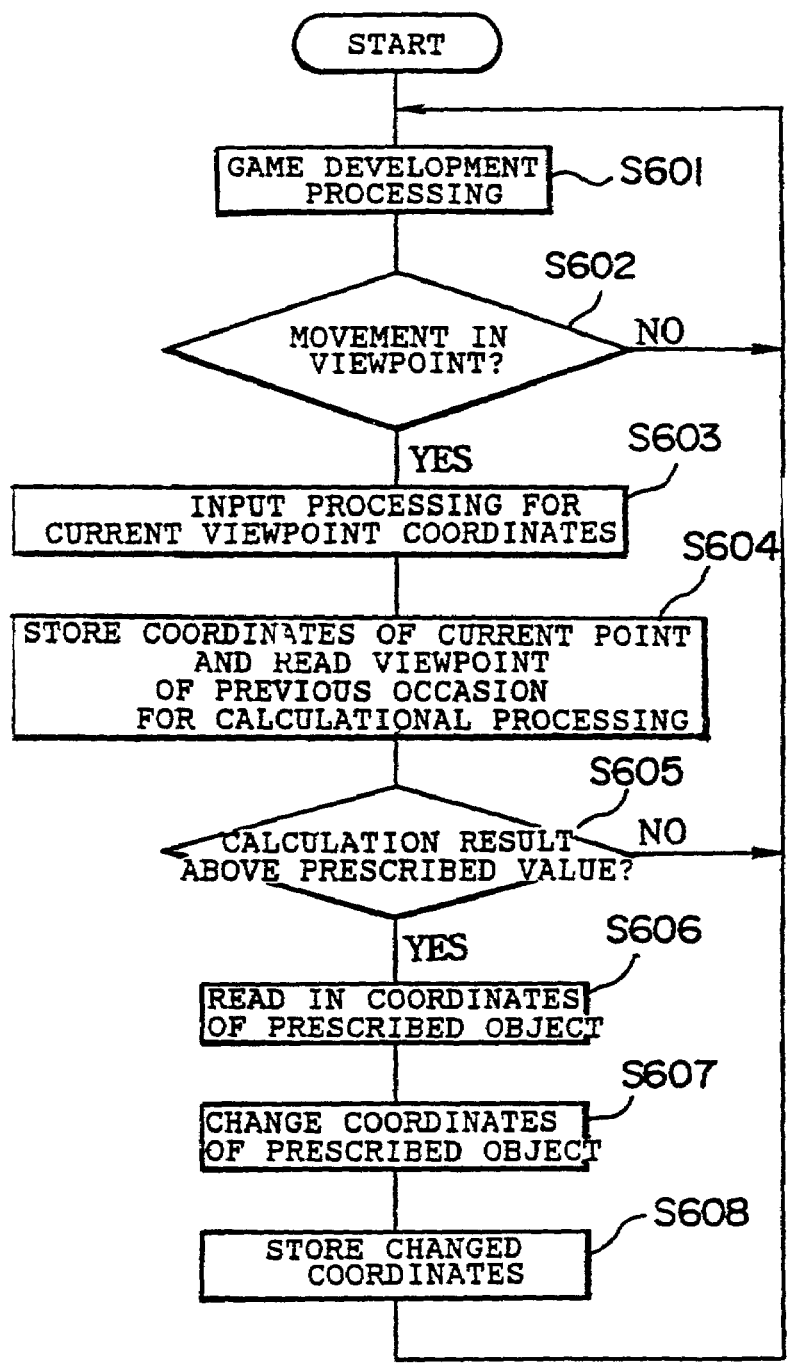
FIG. 15 is a flowchart of an operation for moving a background, or the like, in the same and further embodiments.
Figure 16:
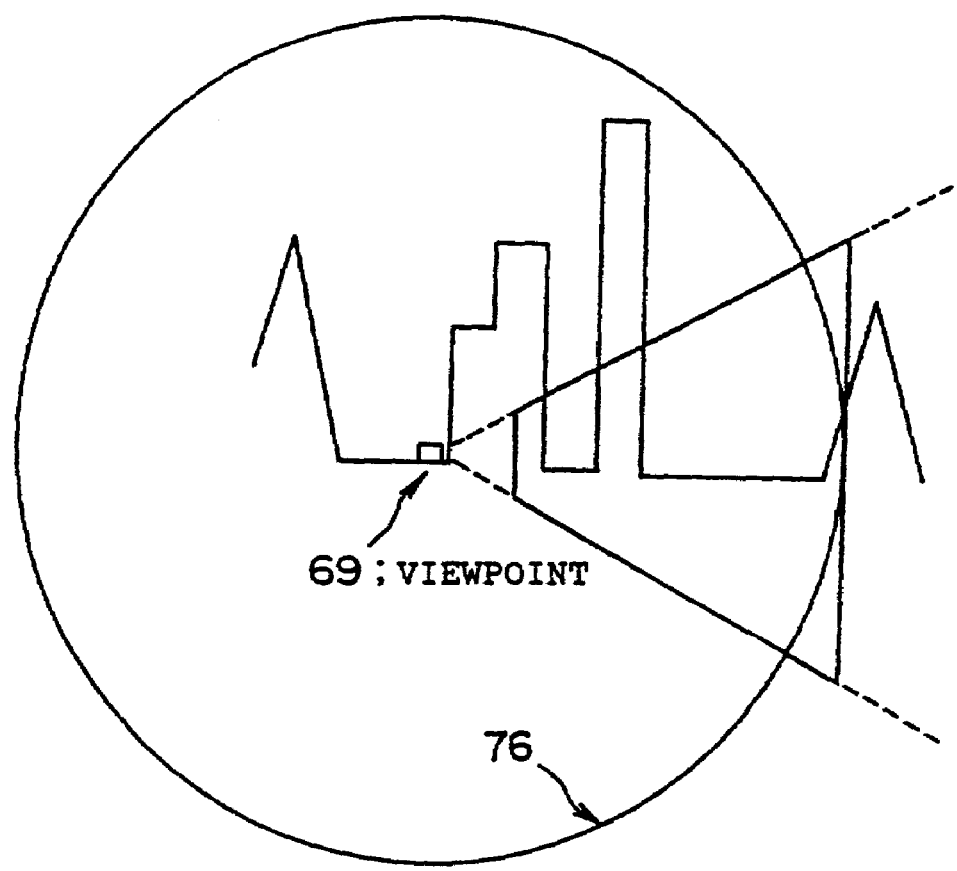
FIG. 16 is an illustrative diagram of the same operation.
Figure 17:
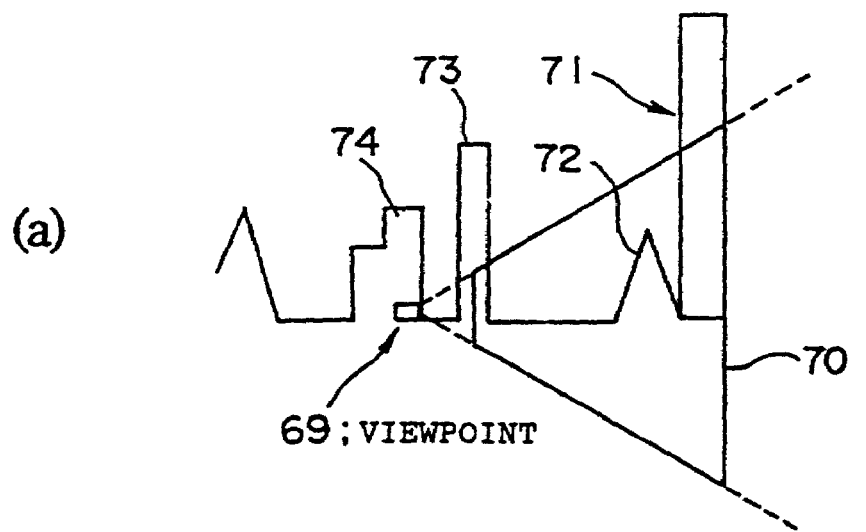
FIG. 17 is an illustrative diagram of the same operation.
Figure 17:
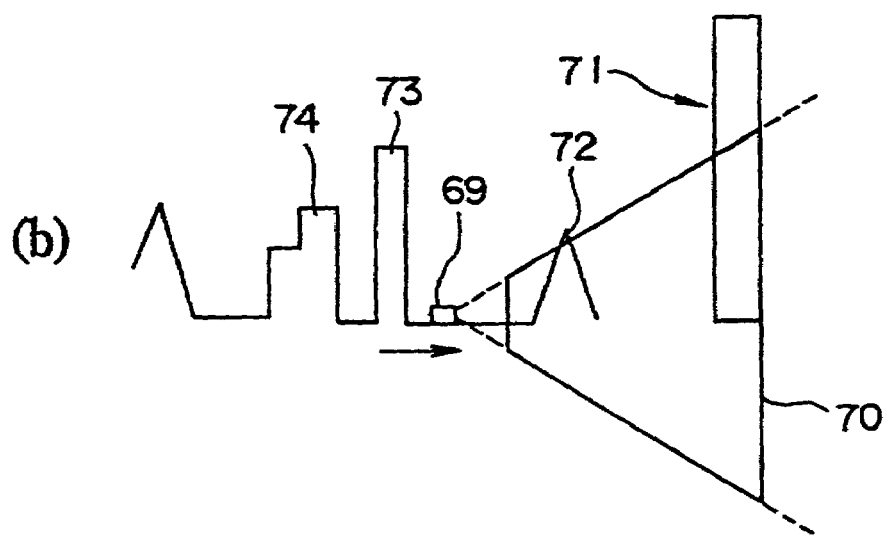

FIG. 15 is a flowchart for describing screen movement processing in this mode for implementation. FIG. 16 is an illustrative diagram of this screen movement processing. FIG. 17 is also an illustrative diagram of this screen movement processing.

In this mode for implementation, a display is created using interactive computer graphics. When Z-buffering is used in this display to erase hidden surfaces, an object which is of the maximum size within the Z-direction display range is prepared. Furthermore, when Z-sorting is used in this display, an object which is sufficiently large compared to the other objects is prepared.

For example, when using Z-buffering, as shown in FIG. 17(a), since the largest object within the display range G from viewpoint 69 is the object 71, then this is set as a movable object. The object 71 is, for example, a background object such as a mountain peak, a celestial body, the sky, or the like. The numerals 72, 73, 74, represent various objects in front of the background.

Firstly, the CPU 101 executes game development processing (step 601), and if there is no movement in the viewpoint (step 602; NO), it returns again to the processing in step 601. At this point, it is in a state as shown in FIG. 17(a), for example.

Thereupon, if the viewpoint 69 moves as shown in FIG. 17(b), for example, (step 602; YES), the CPU 101 inputs the current viewpoint coordinates after the movement (step 603).

The CPU 101 then extracts the preceding viewpoint coordinates input on the previous occasion, from a prescribed area of the RAM 103, in addition to which it writes the new coordinates into a prescribed area of the RAM 103 and conducts a subtraction calculation with the newly input coordinates (step 604).

If the CPU 101 judges that the calculation result is not above a prescribed value (step 605: NO), then it returns to the processing in step 601. This is because, when the distance moved is not very large, there is no considerable change in the appearance of the object 71 in the distance. The threshold value in this step 601 is set on the basis of the distance to the object 71, within a range such that the player does not receive an unnatural impression.

Furthermore, when the CPU 101 judges that this calculation result is above the prescribed value (step 605; YES), it reads the coordinates of the prescribed object 71 (step 606).

Thereupon, the CPU 101 changes the coordinates of the object 71 on the basis of the aforementioned calculation result (step 607). For example, it moves the object 71 away through a distance equal to that by which the viewpoint 69 has approached the object 71. In this case, object 71 and object 72 move apart and there may be a discontinuity between these two objects, but since object 71 is in the extreme distance, no particular unnatural impression is created thereby.

The CPU 101 then stores these coordinates in a prescribed area of the RAM 103 (step 608), whereupon it transfers again to the processing in step 601.

Thus, in this mode for implementation, as shown in FIG. 17(b), if the viewpoint 69 moves, the background 70 of course moves correspondingly, and the object 71 also moves. Therefore, it is possible to prevent changes in appearance as the viewpoint moves.

In other words, no unnatural impression is created, even when representing an object at an infinite distance, such as a celestial body or the sky, or a very large object, or an image that has no distance value, such as an optical phenomenon. This method is particularly beneficial in cases where the Z-buffer for representing the depth of objects is expressed in integers in order to increase the processing speed. Conventionally, in cases of this kind, special processing for representing the depth of objects at infinite distances has been required, but according to this mode for implementation, such processing becomes unnecessary. This eases restrictions on hardware.

As shown in FIG. 16, a sphere 76 of the maximum size within the display range, bearing a representation of a starry sky, or the like, may be created, the viewpoint 69 being positioned at the center point of this sphere 76, and said center point being moved in accordance with movement in the viewpoint. Thus, the position of this sphere 76 changes with movement in the viewpoint 69. When Z-buffering is used, the radius of this sphere 76 is the maximum size in the Z-direction display range. When Z-sorting is used, a celestial sphere or the like at an infinite distance is represented by preparing an object of sufficiently large size compared to the other objects, and moving the position of this object through the same distance as the movement in the viewpoint. A infinitely distant background image of cylindrical shape may also be used in place of the sphere 76.

By this means, even if, for example, the position of viewpoint 69 does not change, but the character looks up, or turns around, an appropriate background, such as a starry sky, or the like, corresponding to this orientation, can always be obtained.

Conventionally, backgrounds of this type have been created by preparing background screens which are pasted onto the display screen, but this appears unnatural because the display does not change, whatever the direction of view.

(Description of Polygon Number Restriction)

Figure 18:
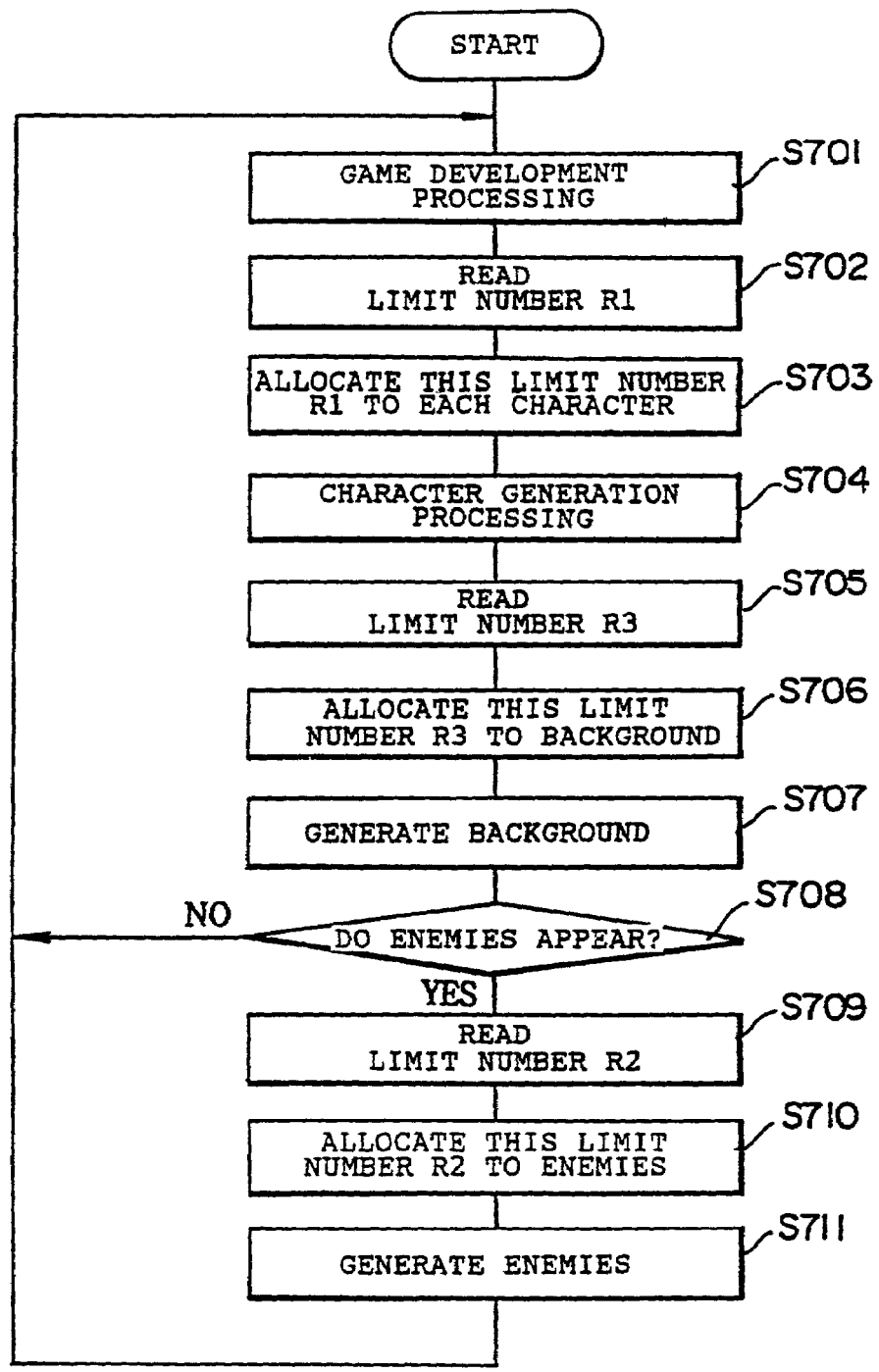
FIG. 18 is a flowchart of an operation relating to polygon restriction in the same and further embodiments.
Figure 19:
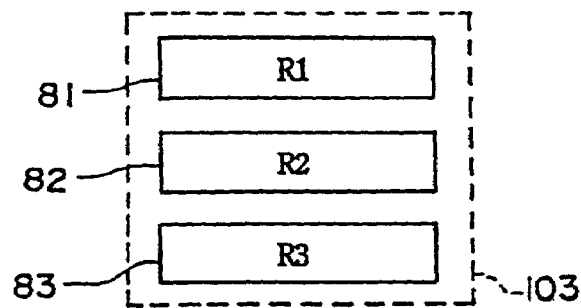
FIG. 19 is an illustrative diagram of the same operation.
Figure 20:
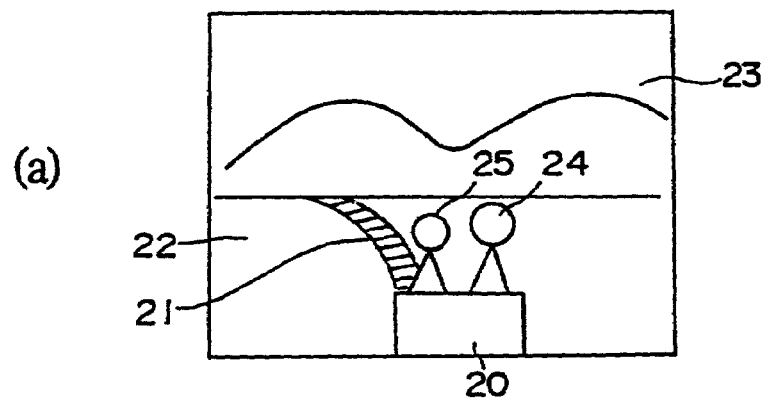
FIG. 20 is an illustrative diagram of the same operation.
Figure 20:
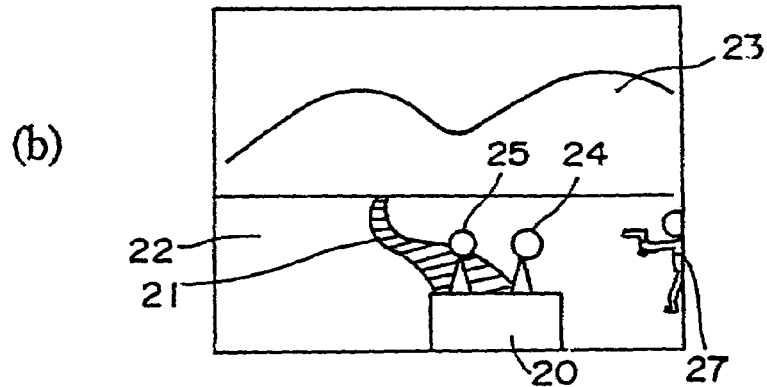

FIG. 18 is a flowchart of an operation for polygon number restriction according to this mode for implementation. FIG. 19 is an illustrative diagram of this mode for implementation. FIG. 20 is also an illustrative diagram of this mode for implementation.

In this mode for implementation, firstly, limit values are applied respectively to the polygons forming the characters 24, 25, the polygons forming the enemies and the like, and the polygons forming the background and the like. As shown in FIG. 19, in this mode for implementation, there are provided a buffer 81 wherein the limit number R1 for the polygons forming the characters 24, 25 is set, a buffer 82 wherein the limit number R2 for the polygons forming the enemies and the like is set, and a buffer 83 wherein the limit number R3 for the polygons forming the background and the like is set. These buffers 81–83 may be provided in the RAM 103, for example. The limit numbers R1–R3 are stored in the ROM 102, and are read to the buffers 81–83 when the operation is initiated.

Next, the operation is described on the basis of the flowchart in FIG. 18.

The CPU 101 executes game development processing (step 701), whereupon it reads the polygon limit number R1 from buffer 81 (step 702). Next, the CPU 101 allocates this to the necessary characters (step 703) and then generates characters such that this allocated polygon number is not exceeded (step 704).

Thereupon, the CPU 101 reads the polygon limit number R3 from buffer 83 (step 705), and then allocates this to the necessary background (step 706). The CPU 101 generates a background such that this allocated polygon number is not exceeded (step 707).

The CPU 101 then determines whether or not any enemies appear (step 708). If no enemies appear (step 708; NO), it transfers back to the processing in step 701. By executing the processing in steps 701–708 in this way, a display screen such as that in FIG. 20(*a*), for example, is created. In FIG. 20(*a*), a truck 20, characters 24, 25 riding therein, a track 21, a land surface 22, and a background 23, are represented.

Furthermore, if enemies do appear (step 708; YES), the CPU 101 moves again to the processing in step 709. At this step, the CPU 101 reads the polygon limit number R2 from buffer 82 (step 709), whereupon it allocates this to the necessary enemies (step 710). The CPU 101 then generates enemies such that this allocated polygon number is not exceeded (step 711). When these steps 708–711 are executed, a display screen such as that in FIG. 20(*b*), for example, is created. In FIG. 20(*b*), a truck 20, characters 24, 25 riding therein, a track 21, a land surface 22, a background 23 and the like, and an enemy 27 aiming a pistol from the side, are represented.

Conventionally, since the overall number of polygons in the background 23 and the like is controlled, there has been a problem in that polygons in the background 23 are lost when a large number of enemies 27 appear. However, according to the present mode for implementation, since the respective upper limits for the enemy 27 and the background 23 are controlled individually, there is no loss of background 23 polygons, even if the enemy 27 appears in large numbers.

(Description of Field of View Angle)

Figure 21:
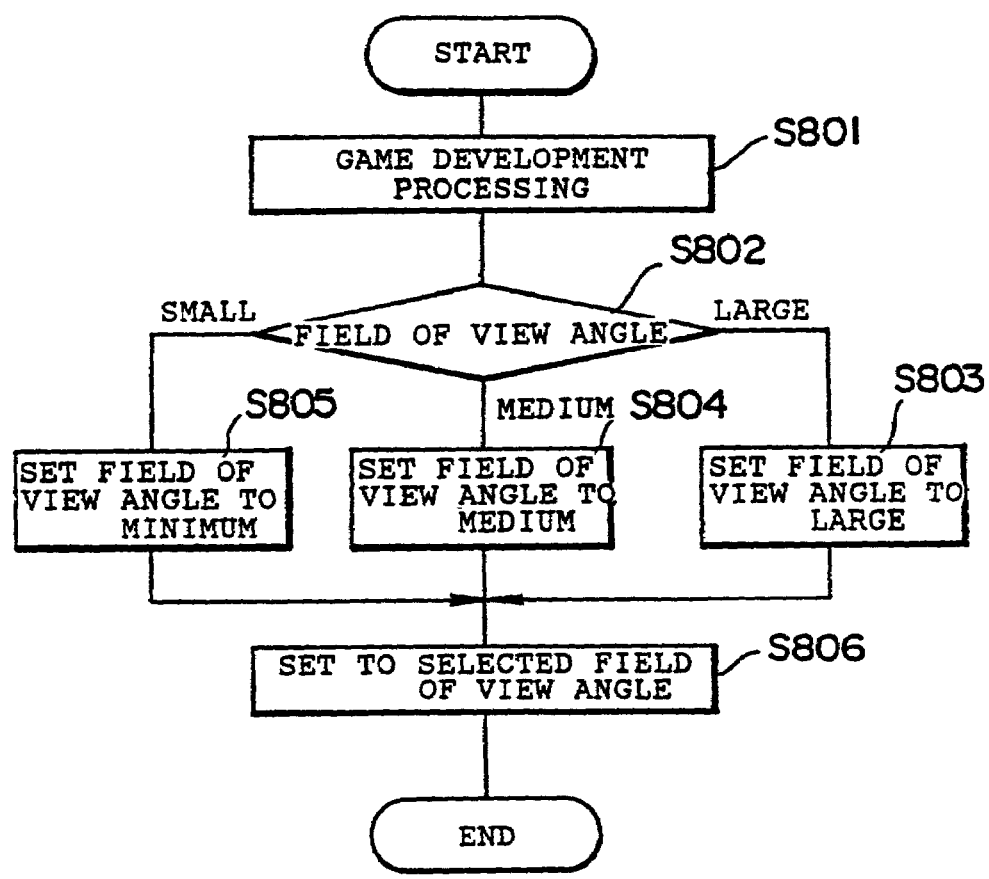
FIG. 21 is a flowchart of an operation relating to field of view angle in the same and further embodiments.
Figure 22A:
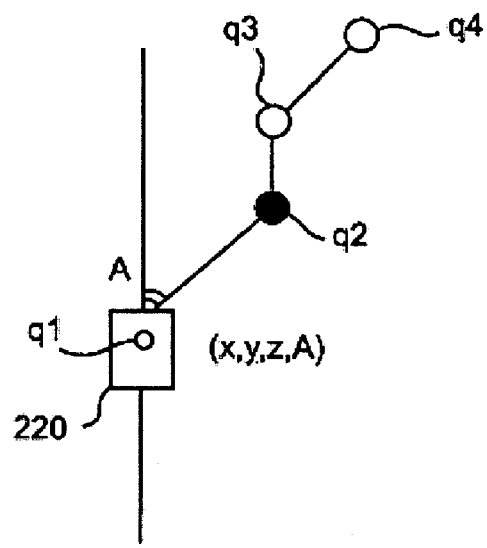
FIG. 22 is an illustrative diagram of conventional angle of view processing.
Figure 22B:
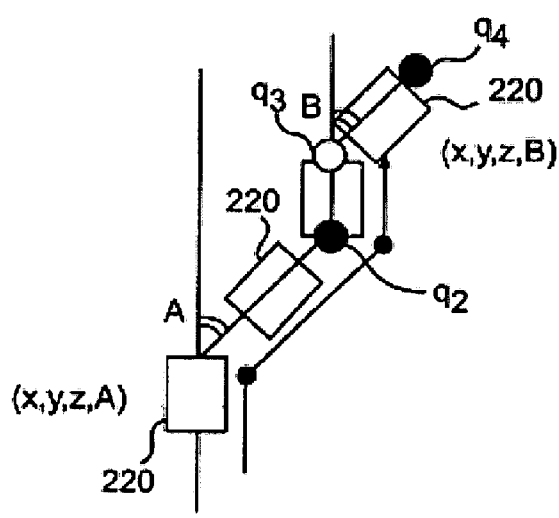
Figure 23:
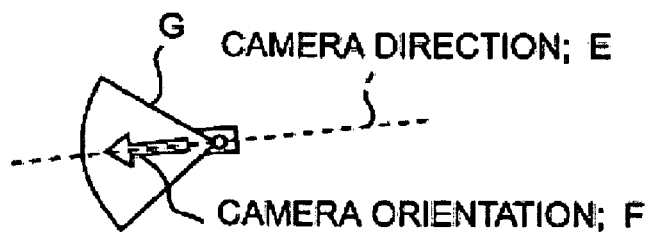
FIG. 23 is an illustrative diagram of camera orientation and field of view.

FIG. 21 is a flowchart for describing the operation of altering the field of view angle.

In FIG. 21, the CPU 101 executes a game development operation on the basis of a program from the ROM 102 (step 801). The field of view angle changes with the game development, in a predetermined manner. The CPU 101 assesses the field of view angle from the game development (step 802). If the truck 20 is travelling across a plain, for example, during the game processing, and the field of view angle is large (step 802; large), then the CPU 101 sets the field of view angle to large (step 803). If it is travelling between hills or buildings, or the like, for example, during the game processing, and the field of view angle is medium (step 802; medium), then the CPU 101 sets the field of view angle to medium (step 804). Furthermore, if it is travelling through a tunnel, for example, during the game processing, and the field of view angle is small (step 802; small), then the CPU 101 sets the field of view angle to small (step 805).

Consequently, at the next step 806, the CPU 101 reads the set field of view angle and executes field of view angle processing (step 806).

Thereby, for example, when the truck 20 is travelling through a tunnel, the field of view angle is set extremely small and the far distance is displayed. When it is travelling through hills or the like, the field of view is set to a medium angle. And when it is travelling across a plain or the like, the field of view is set to a large angle. Changes in the field of view angle of-this kind correspond to sight characteristics in humans, and therefore it is possible to provide an extremely realistic game screen.

The invention claimed is:

1. In an image processing device which causes a moving object composed in three-dimensional spatial coordinates to move, and generates viewpoint images seen from a viewpoint at a position of this moving object using polygons, the image processing device comprising:

polygon number controlling means for classifying the polygons forming said viewpoint image into a plurality of polygon groups, and depending on which category the object belongs, determining a maximum displayed number of polygons set for the object and controlling the object such that the object is displayed with no more number of polygons than the maximum displayed number of polygons.

2. An image processing device according to claim 1, wherein said polygon number controlling means classified the polygons forming said viewpoint image into at least polygon group representing the background and other group.

3. An image processing device according to claim 1 or 2, comprising a display means for displaying said generated viewpoint image.

4. A game device which conducts a game whilst causing said moving object to move in three-dimensional spatial coordinates, the game device comprising an image processing device according to any one of claims 1 to 3.

5. In an image processing method which causes a moving object composed in three-dimensional spatial coordinates to move, and generates viewpoint images seen from a viewpoint at a position of this moving object using polygons, the image processing method comprising:

a first step whereby the polygons forming said viewpoint image are classified into a plurality of polygon groups and a maximum number for the number of polygons displayed is determined for each of said groups; and a second step whereby depending on which category the object belongs, determining the number of polygons displayed in each of said groups and controlling the object such that the object is displayed with no more number of polygons than the maximum number.

6. A storage medium wherein procedures for implementing a method according to any of claim 1 or claim 5, in a processing device, are recorded.

* * * * *